US010853007B2

(12) United States Patent
Kajikawa

(10) Patent No.: US 10,853,007 B2
(45) Date of Patent: Dec. 1, 2020

(54) INFORMATION PROCESSING APPARATUS CONFIGURED TO ADJUST A DISPLAY OF AN ICON BASED ON WHETHER AN ASSOCIATED APPLICATION IS EXECUTABLE ON AN EXTERNAL APPARATUS CONNECTED THERETO, INFORMATION PROCESSING METHOD, AND COMPUTER-READABLE RECORDING MEDIUM

(71) Applicant: Takeshi Kajikawa, Kanagawa (JP)

(72) Inventor: Takeshi Kajikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/297,932

(22) Filed: Mar. 11, 2019

(65) Prior Publication Data
US 2019/0286390 A1    Sep. 19, 2019

(30) Foreign Application Priority Data

Mar. 19, 2018  (JP) .................. 2018-051609
Sep. 28, 2018  (JP) .................. 2018-185755

(51) Int. Cl.
*G06F 3/12*    (2006.01)
*H04N 1/00*    (2006.01)

(52) U.S. Cl.
CPC .......... *G06F 3/1232* (2013.01); *G06F 3/1205* (2013.01); *G06F 3/1287* (2013.01); *H04N 1/0048* (2013.01)

(58) Field of Classification Search
CPC .... G06F 3/1232; G06F 3/1205; G06F 3/1287; G06F 3/1229; G06F 3/1293; G06F 3/1292; H04N 1/0048; H04N 2201/0072
See application file for complete search history.

(56) References Cited

U.S. PATENT DOCUMENTS

2011/0007351 A1* 1/2011 Kurumasa .......... H04N 1/00204
                                                           358/1.15
2014/0082747 A1  3/2014 Negoro et al.
(Continued)

FOREIGN PATENT DOCUMENTS

JP    2013-081127    5/2013
JP    2014-059673    4/2014
(Continued)

*Primary Examiner* — Kent Yip
(74) *Attorney, Agent, or Firm* — Harness, Dickey and Pierce, P.L.C.

(57) ABSTRACT

An information processing apparatus includes: a storage unit that stores a plurality of pieces of application software; a connection control unit that establishes a communication connection to an external apparatus and collects available function information indicating at least one function included in the external apparatus; a determining unit that determines at least one piece of application software that is executable with respect to the external apparatus among the pieces of application software, based on the available function information; a display control unit that displays, on a display unit, the pieces of application software that are determined as being executable, and causes at least one piece of application software that is determined as being inexecutable to be hidden in the display unit or to be displayed on the display unit in a display mode different from a display mode of the pieces of application software that are determined as being executable.

13 Claims, 18 Drawing Sheets

(56) References Cited

U.S. PATENT DOCUMENTS

2016/0062553 A1* 3/2016 Kang .................. G06F 3/0412
715/808
2017/0293457 A1 10/2017 Araki

FOREIGN PATENT DOCUMENTS

| JP | 2017-103814 | 6/2017 |
| JP | 2017-191355 | 10/2017 |

* cited by examiner

FIG.13

| APPLICATION NAME | TO-BE-USED FUNCTION |
|---|---|
| A | COPY |
| B | SCANNER, PRINTER |

500a

| APPLICATION NAME | NECESSARY AUTHORITY |
|---|---|
| A | ADMINISTRATIVE AUTHORITY |
| B | AUTHORITY TO USE SCANNER, AUTHORITY TO USE PRINTER |

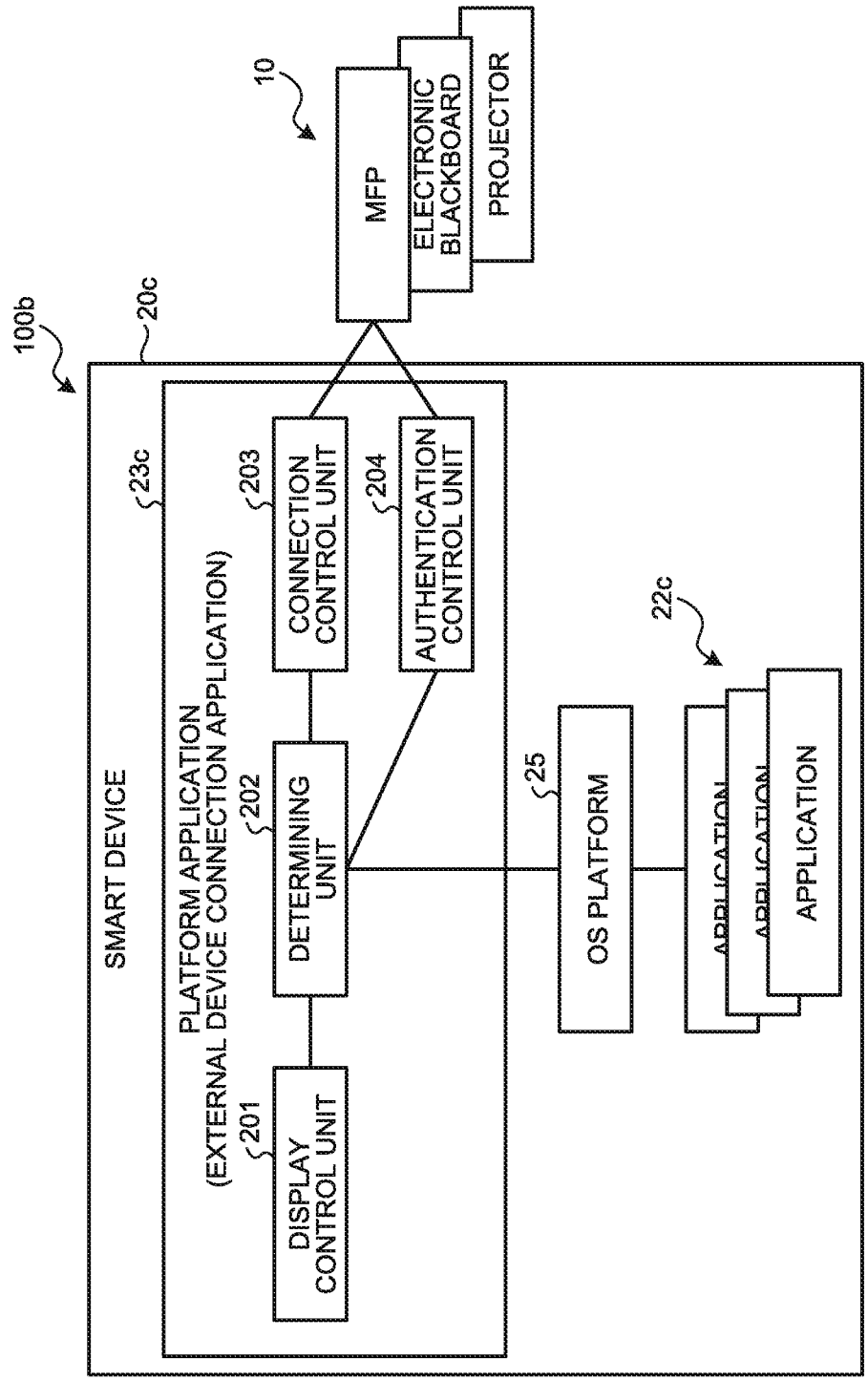

INFORMATION PROCESSING APPARATUS CONFIGURED TO ADJUST A DISPLAY OF AN ICON BASED ON WHETHER AN ASSOCIATED APPLICATION IS EXECUTABLE ON AN EXTERNAL APPARATUS CONNECTED THERETO, INFORMATION PROCESSING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2018-51609, filed on Mar. 19, 2018 and Japanese Patent Application No. 2018-185755, filed on Sep. 28, 2018. The contents of which are incorporated herein by reference in their entirety.

BACKGROUND OF THE INVENTION

1. Field of the Invention

The present invention relates to an information processing apparatus, an information processing method, and a computer-readable recording medium.

2. Description of the Related Art

Conventionally, a technique for allowing a user to perform operation from an information processing apparatus or a fixed operating unit of an image forming apparatus (a communication target or an external apparatus), such as a multifunction peripheral (MFP), to thereby perform processes using functions of the image forming apparatus serving as the communication target has been known.

For example, a technique for performing processes using functions of the image forming apparatus by allowing the user to select and execute a piece of desired application software from among a plurality of pieces of application software displayed on a screen of the information processing apparatus or the fixed operating unit of the image forming apparatus has been known.

However, in the conventional techniques, when the user performs operation on the information processing apparatus or the like, in some cases, it is difficult to distinguish which piece of application software is available in the image forming apparatus connected to the information processing apparatus or the like.

In view of the foregoing situations, there is a need to allow a user to easily recognize application software that is available in an image forming apparatus connected to an information processing apparatus when the user performs operation on the information processing apparatus.

SUMMARY OF THE INVENTION

According to an embodiment, an information processing apparatus includes a storage unit, a connection control unit, a determining unit, and a display control unit. The storage unit stores therein a plurality of pieces of application software. The connection control unit establishes a communication connection to an external apparatus and collects available function information indicating at least one function included in the external apparatus. The determining unit determines at least one piece of application software that is executable with respect to the external apparatus among the pieces of application software, based on the available function information. The display control unit displays, on a display unit, the pieces of application software that are determined as being executable, and causes at least one piece of application software that is determined as being inexecutable to be hidden in the display unit or to be displayed on the display unit in a display mode different from a display mode of the pieces of application software that are determined as being executable.

BRIEF DESCRIPTION OF THE DRAWINGS

FIG. 13 is a diagram illustrating an example of tag information according to the second embodiment;

FIG. 21 is a diagram illustrating an example of an entire configuration of an information processing system according to a sixth embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
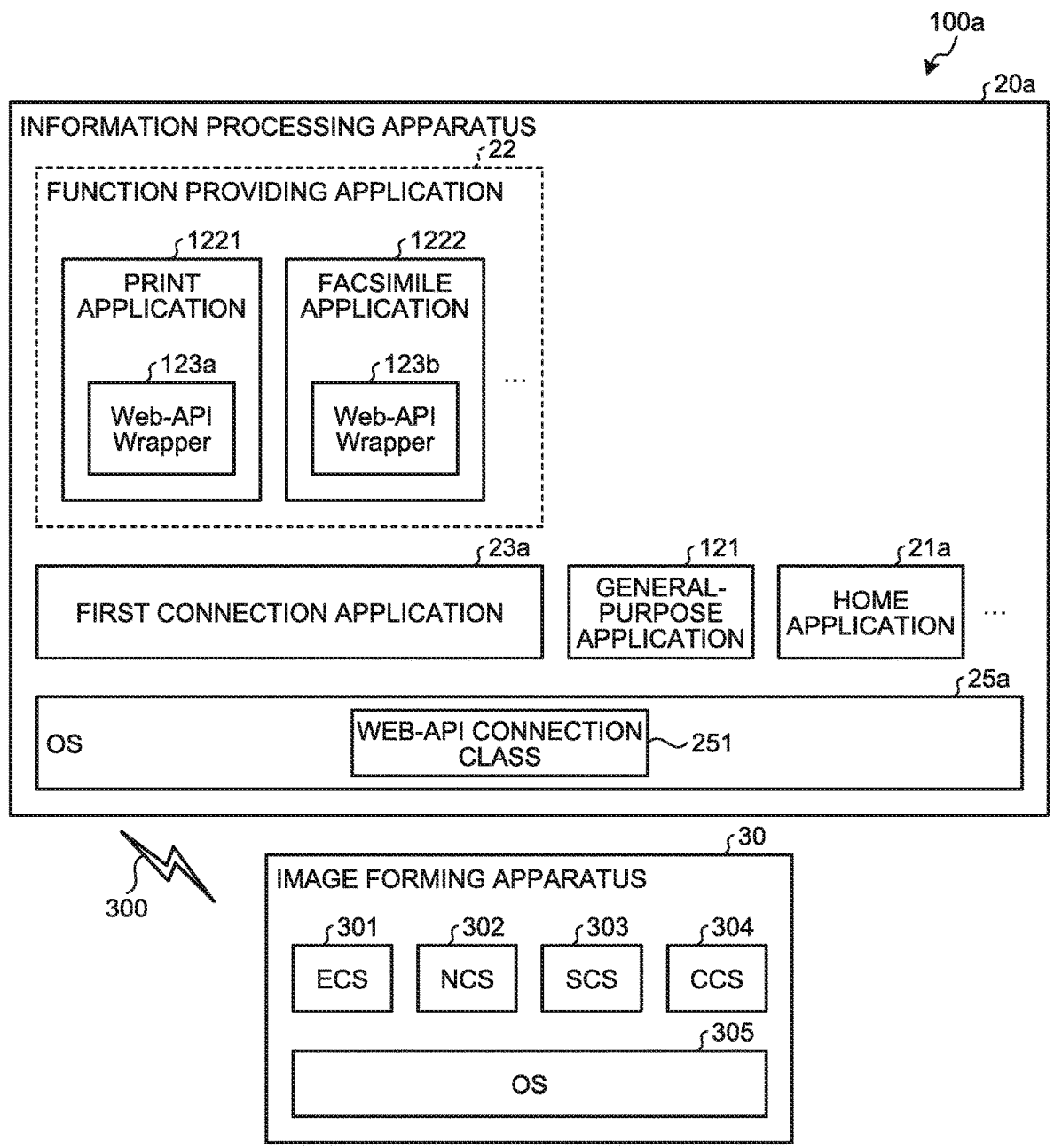
FIG. 1 is a diagram illustrating an example of an entire configuration of an information processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of an information processing apparatus, an information processing method, and a computer-readable recording medium will be described in detail below with reference to the accompanying drawings.

First Embodiment

FIG. 1 is a diagram illustrating an example of an entire configuration of an information processing system 100a according to a first embodiment. As illustrated in FIG. 1, the information processing system 100a includes an information processing apparatus 20a and an image forming apparatus 30.

The image forming apparatus 30 is, for example, a multifunction peripheral (MFP) and has a copy function, a scanner function, a facsimile (FAX) function, a print (printing) function, and the like. As a means of performing each of the copy process, the scanner process, the facsimile process, the print process, and the like, software and hardware, such as a plotter and a scanner, will be collectively referred to as an execution unit. The image forming apparatus 30 acquires, via the information processing apparatus 20a and a wireless network 300, an execution instruction related to processes to be executed, and the execution unit executes the processes based on the acquired execution instruction. Further, the image forming apparatus 30 of the first embodiment includes a fixed operating unit. Details of the image forming apparatus 30 and the fixed operating unit will be described later with reference to FIG. 2.

The information processing apparatus 20a is, for example, an information processing terminal (a smart terminal or a smart device), such as a tablet terminal or a smartphone. As illustrated in FIG. 1, the information processing apparatus 20a includes an operating system (OS) 25a, a first connection application 23a, a function providing application 22, a general-purpose application 121, and a home application 21a.

The OS 25a is an operating system that provides interfaces for hardware functions to various kinds of software, and is, for example, Android (registered trademark) or the like. Further, the OS 25a includes a Web-API connection class 251 as one function. The Web-API connection class 251 may be implemented by different software from the OS 25a. Meanwhile, the OS 25a may include various applications that are needed for operation of a system of the information processing apparatus 20a.

The general-purpose application 121 is a versatile application that is available in the information processing apparatus 20a. Examples of the general-purpose application 121 include an image editing application and an e-mail application. It is possible to install the plurality of general-purpose applications 121 in the information processing apparatus 20a. The plurality of general-purpose applications 121 may have different functions.

Further, the home application 21a may be configured as one of the general-purpose applications 121. The home application 21a displays a main screen on a display device of the information processing apparatus 20a. When a user performs operation of selecting any of the function providing application 22 and the general-purpose application 121 by pressing an icon in the main screen, the home application 21a activates the function providing application 22 or the general-purpose application 121 corresponding to the pressed icon. For example, the home application 21a activates the function providing application 22 or the general-purpose application 121 by sending an instruction signal for designating activation to the function providing application 22 or the general-purpose application 121.

Meanwhile, the user may directly activate a desired one of the function providing applications 22 or the general-purpose application 121 without via the home application 21a, or may activate a desired one of the function providing applications 22 via a different one of the function providing applications 22 or the general-purpose application 121. Further, the home application 21a may display only the function providing applications 22 in the main screen. Furthermore, the first connection application 23a or the function providing applications 22 may have the functions of the home application 21a, instead of providing the home application 21a.

The function providing application 22 is an application that is created so as to operate in both of the information processing apparatus 20a and the fixed operating unit (not illustrated in FIG. 2) of the image forming apparatus 30. It is possible to install the plurality of function providing applications 22 in the information processing apparatus 20a and the fixed operating unit. The number of the function providing applications 22 installed in the information processing apparatus 20a and the fixed operating unit is not specifically limited. For example, it may be possible to install only the single function providing application 22 in the information processing apparatus 20a or the fixed operating unit.

The function providing applications 22 may have different functions. For example, when the image forming apparatus (MPF) 30 is a communication target to which the information processing apparatus 20a is connected, the function providing applications 22 may be applications that provide user interface screens for performing settings and issuing execution instructions with respect to various functions, such as the copy function, the scanner function, the print function, and the FAX function, that are executed by the MFP.

In FIG. 1, as one example, a print application 1221 and a facsimile application 1222 are provided as the function providing applications 22. For example, the print application 1221 provides user interface screens for performing settings and issuing execution instructions with respect to the print function of the image forming apparatus 30, and the facsimile application 1222 provides user interface screens for performing settings and issuing execution instructions with respect to the facsimile function of the image forming apparatus 30. In the first embodiment, the function providing application 22 may be application software that does not use the functions of the image forming apparatus 30. Examples of the application software that does not use the functions of the image forming apparatus 30 among the function providing applications 22 includes a browser application and a camera application.

Further, each of the function providing applications 22 includes a Web-API wrapper 123 (123a and 123b). The Web-API wrapper 123 is a library for providing a class in which the Web-API connection class 251 is wrapped so as to allow the function providing applications 22 to establish communication connections to the image forming apparatus 30 without concern for operation environments. With this configuration, by causing the function providing application 22 to generate an instance of the Web-API wrapper 123, it is possible to acquire, from the function providing application 22, communication connection information (for example, a host name of a connection destination, a port number of the connection destination, or the like) related to a communication connection with the currently connected image forming apparatus 30, and transmit a function execution request to the image forming apparatus 30 using the communication connection information.

Moreover, the function providing application 22 may include, in the function execution request to be transmitted to the image forming apparatus 30, authentication information (for example, a user ID and a password) for performing user authentication, depending on a terminal device (the information processing apparatus 20a or the fixed operating unit of the image forming apparatus 30) in which the function providing application 22 is implemented. Furthermore, the function providing application 22 is able to selectively switch between HTTP and HTTPS and use one of them as a protocol to be used to issue the function execution request to the image forming apparatus 30 depending on the terminal device in which the function providing application 22 is implemented. Meanwhile, the Web-API connection class 251 may be included in the function providing application 22. Further, the Web-API connection class 251 may use functions provided by Android (registered trademark) or the like.

The first connection application 23a establishes a communication connection to the image forming apparatus 30. Further, the first connection application 23a provides, to the Web-API wrapper 123, the communication connection information related to the communication connection to the image forming apparatus 30. Furthermore, the first connection application may have a function to generate a home screen for displaying a list of icons of the function providing applications installed in the information processing apparatus, and a function to display a screen for selecting an image forming apparatus to which the information processing apparatus is to be connected or a screen for receiving authentication information that is needed to log into the image forming apparatus. The first connection application 23a is an application that is created so as to be installed and operate in at least the information processing apparatus 20a out of the information processing apparatus 20a and the fixed operating unit to be described later. For example, the first connection application 23a includes processes unique to the information processing apparatus 20a.

Moreover, while the information processing apparatus 20a and the image forming apparatus 30 are connected in a one-to-one manner in FIG. 1, the information processing apparatus 20a is able to connect to the plurality of image forming apparatuses 30. Furthermore, the image forming apparatus 30 is able to connect to the plurality of information processing apparatuses 20a.

Moreover, the image forming apparatus 30 may be operated by not only the information processing apparatus 20a but also the fixed operating unit of the image forming apparatus 30. The fixed operating unit of the image forming apparatus 30 will be described in detail below.

Figure 2:
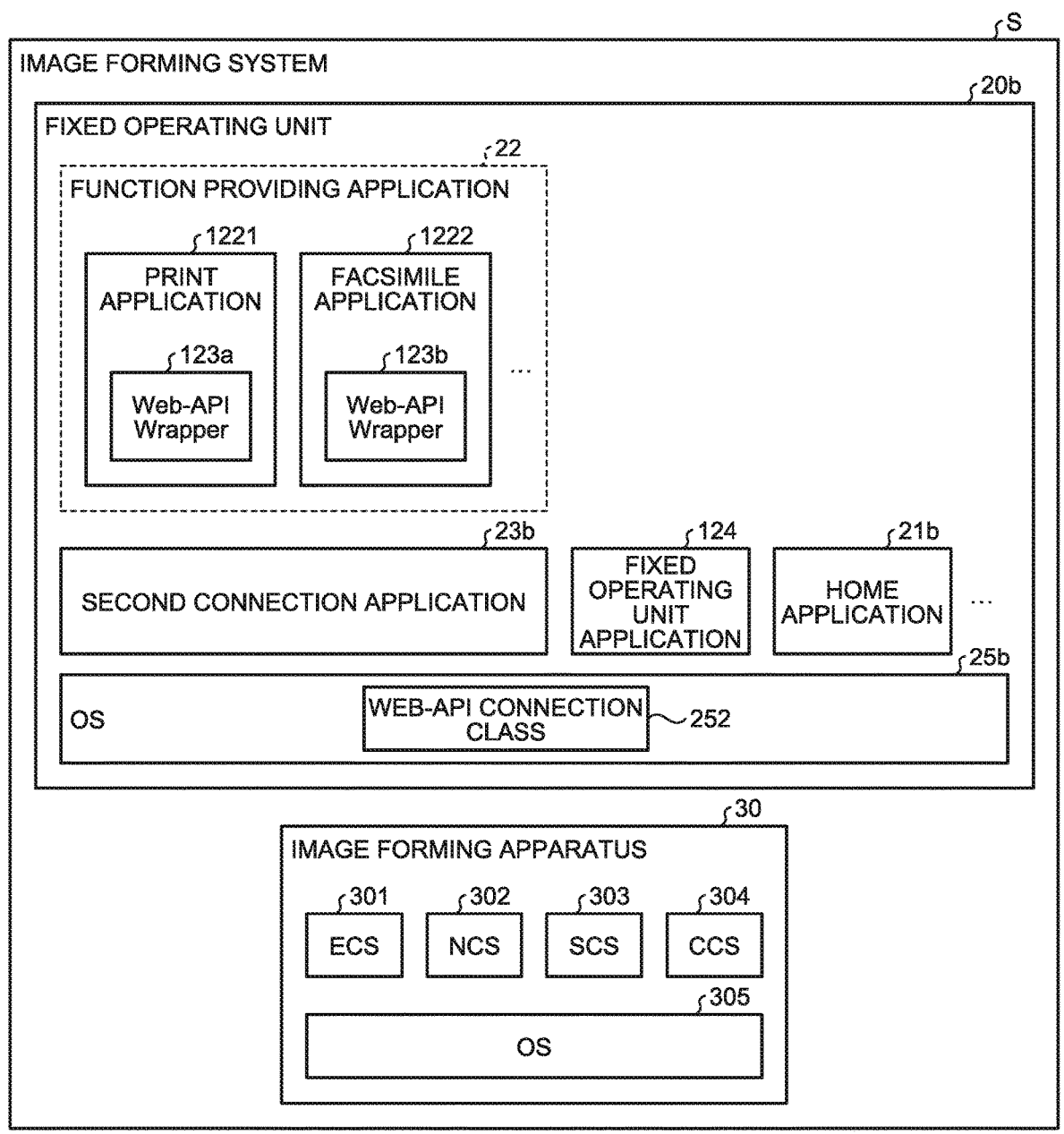
FIG. 2 is a diagram illustrating an example of an entire configuration of an image forming system according to the first embodiment.

FIG. 2 is a diagram illustrating an example of an entire configuration of an image forming system S according to the first embodiment. As illustrated in FIG. 2, the image forming system S includes a fixed operating unit 20b and the image forming apparatus 30.

The fixed operating unit 20b may be removably mounted on a main body (the image forming apparatus 30). Further, the fixed operating unit 20b may be able to perform communication with a plurality of image forming apparatus, in addition to the image forming apparatus 30. For example, the fixed operating unit 20b may be communicably connected to the image forming apparatus 30 via a signal line, and may further be able to perform communication with a different image forming apparatus by wireless communication. The fixed operating unit 20b includes an OS 25b, a second connection application 23b, the function providing applications 22, a fixed operating unit application 124, and a home application 21b.

The function providing applications 22 included in the fixed operating unit 20b and the Web-API wrappers 123 included in the respective function providing applications 22 have the same functions as those of the function providing applications 22 included in the information processing apparatus 20a and the Web-API wrappers 123 included in the respective function providing applications 22. It is assumed that the same function providing applications 22 can be installed in the information processing apparatus 20a and the fixed operating unit 20b.

Further, the second connection application 23b included in the fixed operating unit 20b provides the same functions as those of the first connection application 23a included in the information processing apparatus 20a. However, the second connection application 23b includes processes unique to the fixed operating unit 20b. The second connection application 23b is an application that is created so as to be installed and operate in at least the fixed operating unit 20b out of the information processing apparatus 20a and the fixed operating unit 20b. In the following description, when the first connection application 23a and the second connection application 23b need not be distinguished from each other, they are collectively referred to as a connection application 23.

The OS 25b is an operating system that provides interfaces for hardware functions to various kinds of software, and is, for example, Android (registered trademark) or the like. Further, the OS 25b includes a Web-API connection class 252 as one function.

The Web-API connection class 252 provides the same functions as those of the Web-API connection class 251 included in the information processing apparatus 20a. However, the Web-API connection class 252 includes processes unique to the fixed operating unit 20b. Further, the Web-API connection class 252 may be implemented by different software from the OS 25b. Meanwhile, the OS 25b may be an OS that is customized to run on the fixed operating unit 20b, and may include various applications that are needed for operation of a system of the fixed operating unit 20b.

The fixed operating unit application 124 is a dedicated application that is available only in the fixed operating unit 20b. For example, when the image forming apparatus (MPF) 30 is a communication target to which the fixed operating unit 20b is connected, the fixed operating unit application 124 may be an application that provides user interface screens for performing settings and issuing execution instructions with respect to various functions, such as the copy function, the scanner function, the print function, and the FAX function, that are executed by the MFP. The fixed operating unit 20b may include a fixed operating unit platform to implement the fixed operating unit application 124. In this case, the fixed operating unit platform may include a part or all of the functions of the second connection application 23b, or may be provided separately from the second connection application 23b.

As illustrated in FIG. 1 and FIG. 2, the image forming apparatus 30 includes an OS 305, an engine control service (ECS) 301, a network control service (NCS) 302, a system control service (SCS) 303, and a certification control service (CCS) 304.

The OS 305 is an OS that is different and independent from the information processing apparatus 20a and the fixed operating unit 20b, and provides interfaces for hardware functions to various kinds of software.

The ECS 301 manages and arbitrates hardware of an image engine including the plotter, the scanner, and the like.

The NCS 302 manages or arbitrates hardware of a network interface (I/F) included in the image forming apparatus 30, and receives a Web-API request (for example, an HTTP request, an HTTPS request, or the like) from the Web-API connection classes 251 and 252.

The SCS 303 manages operation related to the entire system, such as managing operation of causing the main body (the image forming apparatus 30) and the fixed operating unit 20b to resume from an energy-saving mode or managing jobs, and controls counters, screens, settings, and the like.

The CCS 304 manages user authentication, authentication states, and use restriction of the main body (the image forming apparatus 30) and the fixed operating unit 20b.

The ECS 301, the NCS 302, the SCS 303, the CCS 304, and the image engine are examples of components that constitute a functional unit that implements predetermined functions. Further, the functional unit may include software and hardware for providing various functions, such as the copy function, the scanner function, the print function, and the FAX function, in addition to the above-described functions.

Furthermore, in the first embodiment, application software that is executed to provide the copy function, the scanner function, the FAX function, the print function, and the like in the image forming apparatus 30 is referred to as an "application of the image forming apparatus 30".

Meanwhile, the image forming apparatus 30 is one example of a communication target, and the communication target performs communication with the information processing apparatus 20a or the fixed operating unit 20b. The communication target is not limited to the image forming apparatus 30, and various electronic devices, such as office equipment including an electronic blackboard or a projector, may be adopted.

In the first embodiment, as illustrated in FIG. 1 and FIG. 2, the function providing application 22 and the connection application 23 are separately provided in the information processing apparatus 20a and the fixed operating unit 20b. The function providing application 22 is usually generated by a third party that is different from manufacturers that manufacture devices, such as the image forming apparatus 30. Therefore, as in the first embodiment, by causing the connection application 23 that is provided separately from the function providing application 22 to establish a connection to the image forming apparatus 30, the function providing application 22 is able to provide functions even without having a function to connect to the image forming apparatus 30. Therefore, a third party creator of the function providing application 22 can easily create the function providing application 22.

Furthermore, regarding the connection to the image forming apparatus 30, processes unique to each of the devices (the fixed operating unit 20b and the information processing apparatus 20a) are provided in the connection application 23, and therefore, the function providing application 22 need not include the processes unique to each of the devices. In other words, the function providing application 22 can be shared by all of the devices. Thus, the creator of the function providing application 22 can easily create the function providing application 22 because he/she need not create the function providing application 22 for each of the devices.

Meanwhile, each of the functions of the information processing apparatus 20a and the fixed operating unit 20b as described above is implemented by, for example, causing a central processing unit (CPU) to execute a program stored in a read only memory (ROM) or a hard disk drive (HDD) in the information processing apparatus 20a or the fixed operating unit 20b. The program executed by the CPU may be provided by being installed in the information processing apparatus 20a or the fixed operating unit 20b in advance, or may be provided from outside and then installed in the information processing apparatus 20a or the fixed operating unit 20b. In the latter case, the program may be provided by an external storage medium (for example, a universal serial bus (USB) memory, a memory card, a compact disk-ROM (CD-ROM), or the like), or may be provided by being downloaded from a server or the like on a network (for example, the Internet or the like).

The first embodiment will be described in further detail below. In the following description, the information processing apparatus 20a will be described as an example, but the fixed operating unit 20b is able to perform the same processes as those of the information processing apparatus 20a.

A hardware configuration of the image forming apparatus 30 will be described below.

Figure 3:
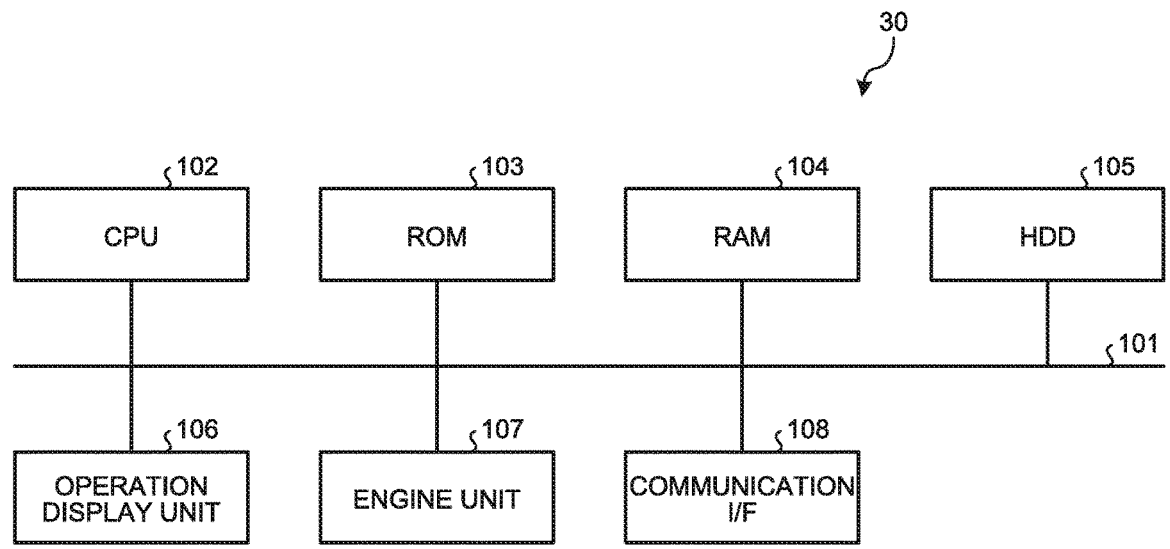
FIG. 3 is a diagram illustrating an example of a hardware configuration of an image forming apparatus according to the first embodiment.

FIG. 3 is a diagram illustrating an example of the hardware configuration of the image forming apparatus 30 according to the first embodiment. As illustrated in FIG. 3, the image forming apparatus 30 includes a CPU 102, a ROM 103, a random access memory (RAM) 104, an HDD 105, an operation display unit 106, an engine unit 107, and a communication I/F 108. All of the units as described above are connected to one another via a system bus 101.

The operation display unit 106 receives user operation and various kinds of input corresponding to the operation, and displays various kinds of information. For example, the operation display unit 106 is constructed with a liquid crystal display (LCD) device having a touch panel function.

The engine unit 107 is hardware that performs general-purpose information processing and processing other than communication in order to implement the functions of the image forming apparatus 30. For example, the engine unit 107 includes a scanner (image reading unit) that scans and reads an image of a document, a plotter (image forming unit) that performs printing on a sheet material, such as paper, a facsimile unit that performs facsimile communication, and the like.

Next, a hardware configuration of the information processing apparatus 20a will be described.

Figure 4:
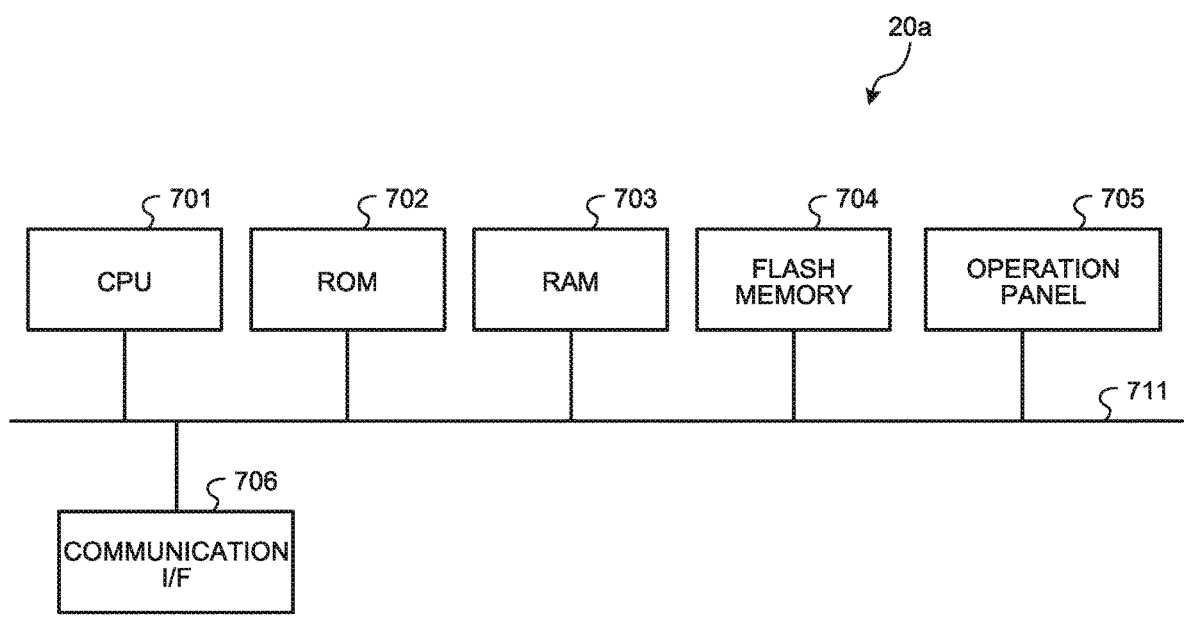
FIG. 4 is a diagram illustrating an example of a hardware configuration of an information processing apparatus according to the first embodiment.

FIG. 4 is a diagram illustrating an example of the hardware configuration of the information processing apparatus 20a according to the first embodiment. As illustrated in FIG. 4, the information processing apparatus 20a includes a CPU 701, a ROM 702, a RAM 703, a flash memory 704, an operation panel 705, and a communication I/F 706. The ROM 702, the RAM 703, and the flash memory 704 are examples of a storage unit of the first embodiment. All of the units as described above are connected to one another via a system bus 711.

The operation panel 705 is, for example, a touch panel display in which a touch panel and a display are integrated, and includes an input unit for performing operation on the information processing apparatus 20a and a display unit for displaying a processing result etc. of the information processing apparatus 20a. The information processing apparatus 20a may be configured such that the input unit and the display unit are provided separately.

Functions of the connection application 23 installed in the information processing apparatus 20a or the fixed operating unit 20b will be described in detail below.

Figure 5:
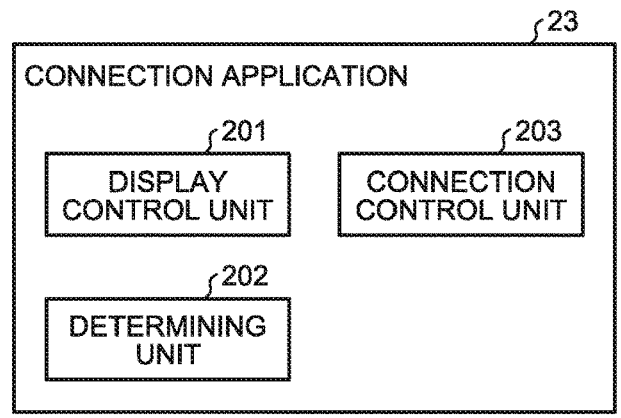
FIG. 5 is a block diagram illustrating an example of functions of a connection application according to the first embodiment.

FIG. 5 is a block diagram illustrating an example of the functions of the connection application 23 according to the first embodiment. As illustrated in FIG. 5, the connection application 23 of the first embodiment includes a display control unit 201, a determining unit 202, and a connection control unit 203.

The connection control unit 203 establishes a communication connection to the image forming apparatus 30, and collects available function information on the image forming apparatus 30. The available function information is information indicating one or more functions included in the image forming apparatus 30. More specifically, upon establishing a communication connection to the image forming apparatus 30, the connection control unit 203 acquires, from the image forming apparatus 30, information on applications that are installed in the image forming apparatus 30 and that are activated on the image forming apparatus 30. For example, the connection control unit 203 may acquire the information on the applications that are installed in the image forming apparatus 30 and that are activated on the image forming apparatus 30, from a program of a software development kit (SDK) service of the image forming apparatus 30, application software that aggregates information on an apparatus state of the image forming apparatus 30, or the like. Further, a method and timing of acquiring the information on the applications of the image forming apparatus 30 are not limited to those as described above. For example, the image forming apparatus 30 notifies the connection control unit 203 of the available function information when an activation state of an application of the image forming apparatus 30 is changed in the image forming apparatus 30. Furthermore, the available function information acquired by the connection control unit 203 may include a power state of the image forming apparatus 30, information on a function that may be provided by the image forming apparatus 30, such as an option function connected to the image forming apparatus 30, information on performance of the image forming apparatus 30, or the like.

The determining unit 202 determines the function providing application 22 that is executable with respect to the image forming apparatus 30 connected to the information processing apparatus 20a among the plurality of function providing applications 22 installed in the information processing apparatus 20a, on the basis of the available function information acquired by the connection control unit 203.

The display control unit 201 displays, on the operation panel 705, the function providing application 22 that is determined, by the determining unit 202, as being executable.

Figure 6:
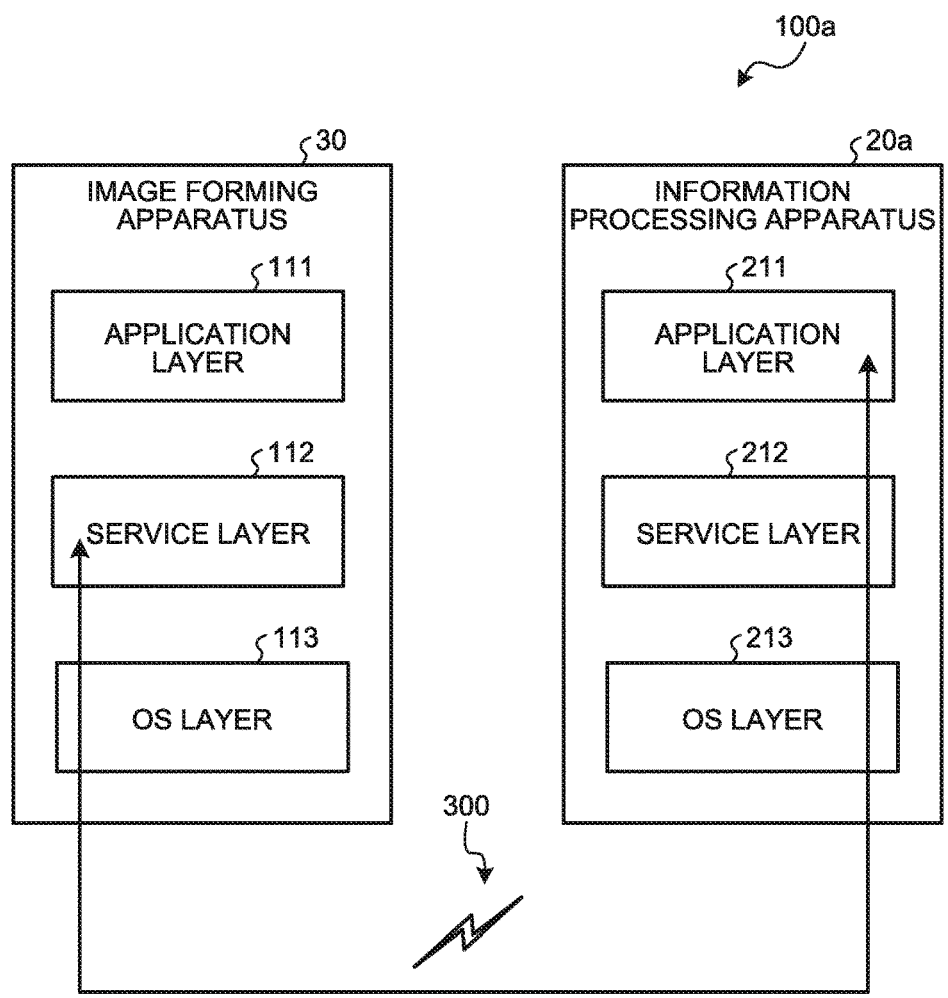
FIG. 6 is a diagram illustrating an example of software configurations according to the first embodiment.

Next, software configurations of the image forming apparatus 30 and the information processing apparatus 20a will be described. FIG. 6 is a diagram illustrating an example of the software configurations according to the first embodiment. As illustrated in FIG. 6, the image forming apparatus 30 includes an application layer 111, a service layer 112, and an OS layer 113. Substance of the application layer 111, the service layer 112, and the OS layer 113 is various kinds of software stored in the ROM 103, the HDD 105, or the like. Various functions are provided by causing the CPU 102 to execute the above-described software.

The image forming apparatus 30 and the information processing apparatus 20a of the first embodiment are able to perform communication with each other via the wireless network 300. A means of connecting the image forming apparatus 30 and the information processing apparatus 20a is not limited to the wireless communication, but may be wired communication using a USB cable or the like.

Software of the application layer 111 is application software for operating hardware resources and providing predetermined functions, and is the above-described application of the image forming apparatus 30. Examples of types of the applications of the image forming apparatus 30 include a copy application for providing the copy function, a scanner application for providing the scanner function, a facsimile application for providing the facsimile function, and a printer application for providing the print function.

Software of the service layer 112 is software that is interposed between the application layer 111 and the OS layer 113 and that is for providing interfaces for using hardware resources included in the image forming apparatus 30 to the applications of the image forming apparatus 30. More specifically, the software of the service layer 112 is software for receiving operation requests with respect to the hardware resources and providing a function to arbitrate the operation requests. The operation requests received by the service layer 112 may be a request for read using the scanner, a request for printing using the plotter, and the like.

Meanwhile, interface functions of the service layer 112 are provided to not only the application layer 111 of the image forming apparatus 30 but also an application layer 211 of the information processing apparatus 20a. In other words, the application layer 211 (the connection application 23 and the function providing applications 22) of the information processing apparatus 20a are able to implement functions using the hardware resources (for example, the engine unit 107) of the image forming apparatus 30 via the interface functions of the service layer 112.

Software of the OS layer 113 is basic software (the OS 305) for providing basic functions to control the hardware included in the image forming apparatus 30. The software of the service layer 112 converts hardware-resource use requests received from various applications into commands that can be interpreted by the OS layer 113, and sends the commands to the OS layer 113. Then, the software of the OS layer 113 executes the commands, so that the hardware resources perform operation in accordance with the requests issued by the applications.

Similarly, the information processing apparatus 20a includes the application layer 211, a service layer 212, and an OS layer 213. A hierarchical structure of the application layer 211, the service layer 212, and the OS layer 213 included in the information processing apparatus 20a is the same as that of the image forming apparatus 30. The function providing applications 22 and the connection application 23 described above with reference to FIG. 1 are software of the application layer 211, and the OS 25a is software of the OS layer 213.

Next, processes performed by the information processing apparatus 20a and the image forming apparatus 30 configured as described above will be described.

Figure 7:
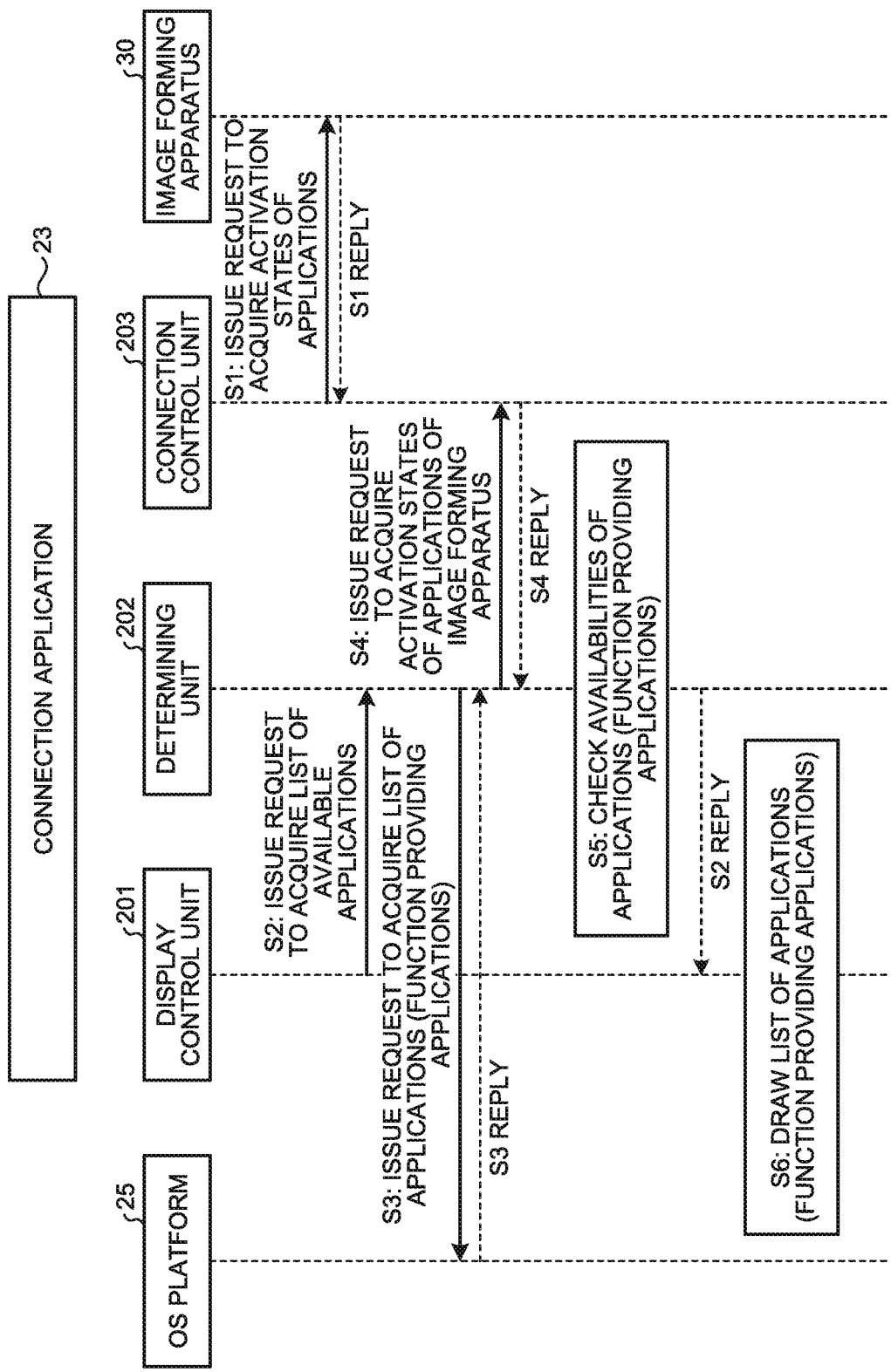
FIG. 7 is a sequence diagram illustrating an example of the flow of a list screen display process according to the first embodiment.

FIG. 7 is a sequence diagram illustrating an example of the flow of a list screen display process according to the first embodiment. In FIG. 7, the information processing apparatus 20a establishes a communication connection to the image forming apparatus 30 (MFP) that is one example of the communication target.

Figure 8:
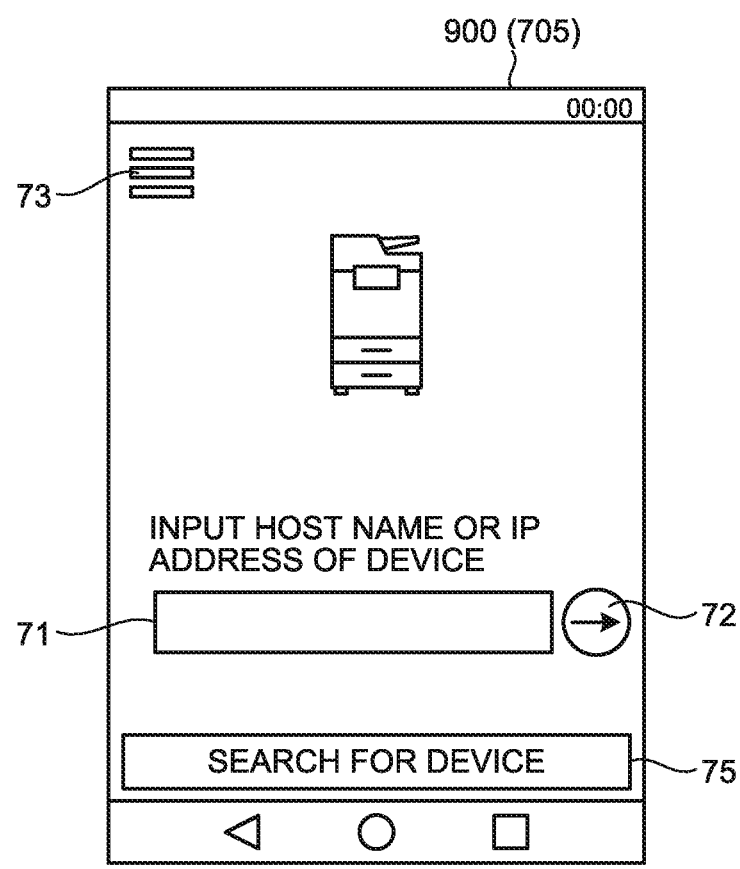
FIG. 8 is a diagram illustrating an example of a connection screen according to the first embodiment.

As the premise of the process illustrated in FIG. 7, the connection application 23 of the information processing apparatus 20a is activated by user operation or the like. When the connection application 23 is activated, the display control unit 201 displays, on the operation panel 705, a connection screen capable of receiving connection operation with respect to the image forming apparatus 30. FIG. 8 is a diagram illustrating an example of a connection screen 900 according to the first embodiment. As illustrated in FIG. 8, the connection screen 900 includes an entry field 71 in which a host name or an IP address for identifying the image forming apparatus 30 serving as a connection destination can be input, and an execution button 72. Further, as in the example illustrated in FIG. 8, the connection screen 900 may further include a menu button 73, a search button 75 for searching for an apparatus serving as a connection destination (the image forming apparatus 30), and the like.

If the connection application 23 receives user operation of pressing the execution button 72 in the connection screen 900, the connection control unit 203 establishes a communication connection to the image forming apparatus 30. Further, the connection control unit 203 acquires activation states of the applications of the image forming apparatus 30 from the image forming apparatus 30 to which the communication connection is established (S1). The connection control unit 203 collects applications activated on the image forming apparatus 30 as the available function information.

Subsequently, the display control unit 201 issues a request to acquire a list of the available function providing applications 22 to the determining unit 202 (S2). Upon receiving the request from the display control unit 201, the determining unit 202 issues, to the OS 25a, a request to acquire a list of the function providing applications 22 that are installed in the information processing apparatus 20a (S3). The OS 25a transmits, to the determining unit 202, a list of the function providing applications 22 that are installed in the information processing apparatus 20a and that are available. At this time, the determining unit 202 may request a list of only pieces of application software (external apparatus function providing applications) that perform processes using the functions of the image forming apparatus 30 among the function providing applications 22.

Upon acquiring the list of the function providing applications 22 from the OS 25a, the determining unit 202 sends a query about the activation states of the applications of the image forming apparatus 30 to the connection control unit 203, and acquires the available function information that has been acquired by the connection control unit 203 through the process at S1 (S4).

Subsequently, the determining unit 202 checks (determines) availabilities of the function providing applications 22 that are acquired from the OS 25a (S5). More specifically, the determining unit 202 compares the list of the function providing applications 22 acquired from the OS 25a and the available function information acquired from the determining unit 202, and determines whether each of the function providing applications 22 included in the list of the function providing applications 22 is available (executable). For example, if the available function information includes the function of the image forming apparatus 30 to be used by the function providing application 22, the determining unit 202 determines that the function providing application 22 is executable. Further, if the available function information does not include the function of the image forming apparatus 30 to be used by the function providing application 22, the determining unit 202 determines that the function providing application 22 is inexecutable. For example, when the function providing application 22 is a scanner application using the scanner function of the image forming apparatus 30, and if the available function information on the image forming apparatus 30 does not include the scanner function, the determining unit 202 determines that the function providing application 22 is inexecutable.

Figure 9:
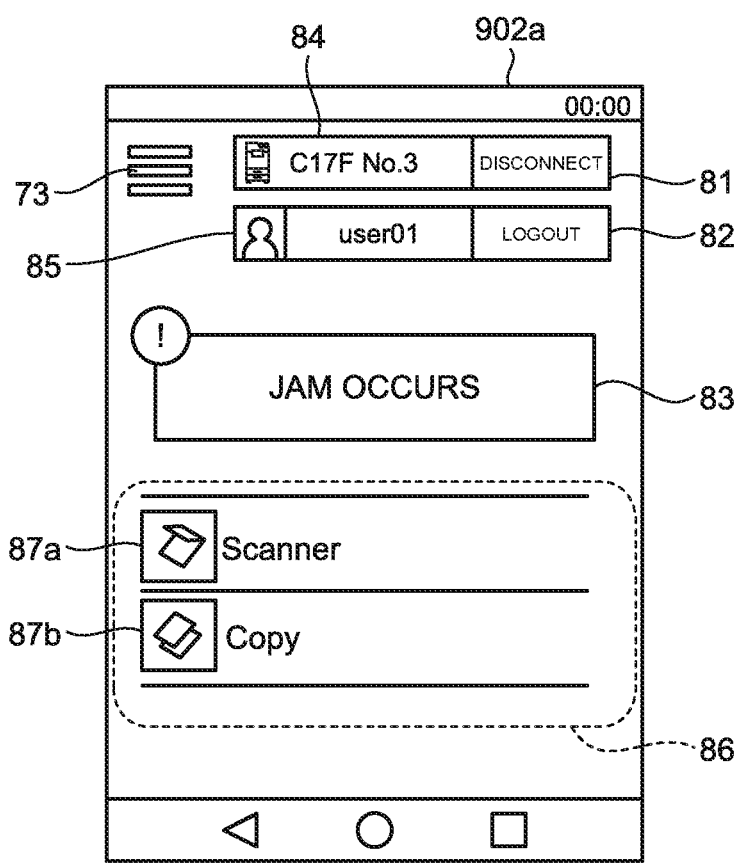
FIG. 9 is a diagram illustrating an example of a UI screen according to the first embodiment.

Subsequently, the display control unit 201 acquires, from the determining unit 202, a list of the function providing applications 22 that are determined as being available (executable), and draws (displays) the list on the operation panel 705 (S6). FIG. 9 is a diagram illustrating an example of a user interface (UI) screen 902a according to the first embodiment. As illustrated in FIG. 9, the UI screen 902a is a screen displayed on the operation panel 705, and includes a display area 86 for displaying an application list. The display control unit 201 displays, in the display area 86 of the UI screen 902a, the list of the function providing applications 22 that are determined as being available (executable). In the example illustrated in FIG. 9, the display control unit 201 displays, in the display area 86, an icon 87a of the scanner application and an icon 87b of the copy application as the available function providing applications 22. When the user presses the icon 87a or the icon 87b displayed in the display area 86, the scanner application or the copy application is activated.

Figure 10:
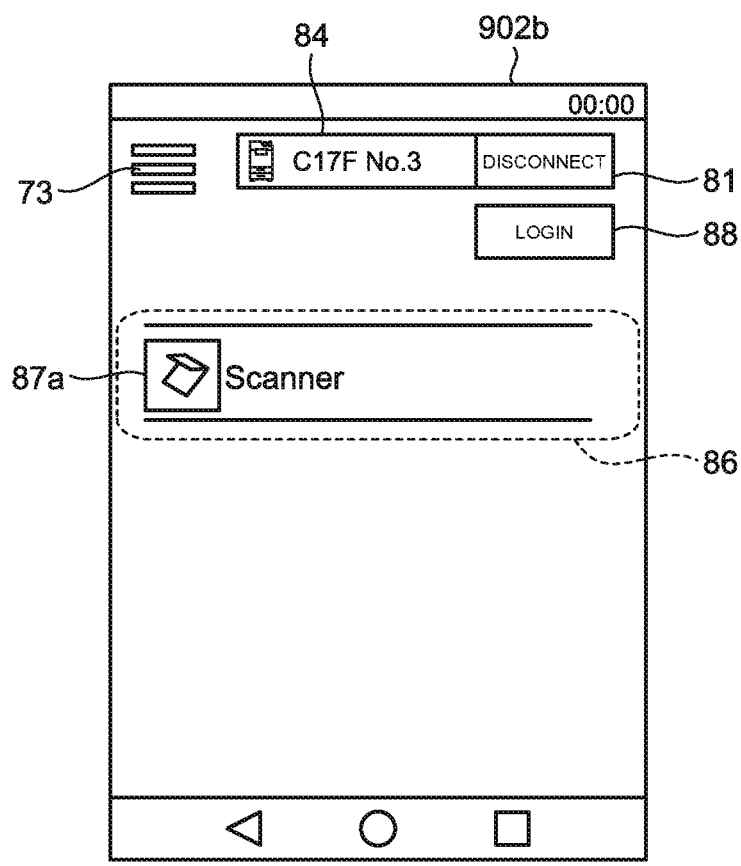
FIG. 10 is a diagram illustrating another example of the UI screen according to the first embodiment.
Figure 11:
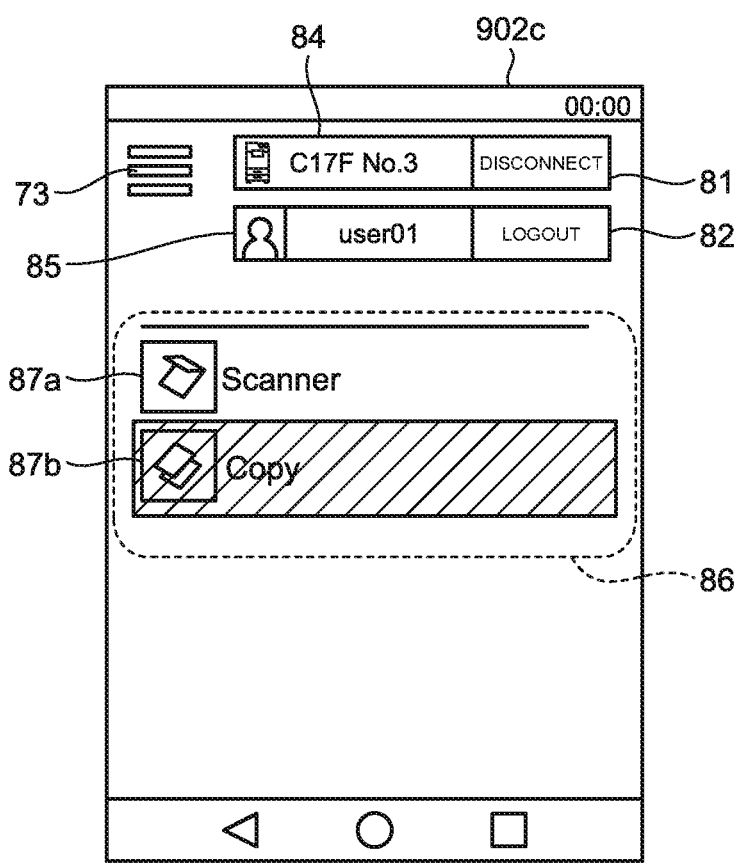
FIG. 11 is a diagram illustrating a still another example of the UI screen according to the first embodiment.

FIG. 10 is a diagram illustrating an example of another UI screen 902b according to the first embodiment. FIG. 11 is a diagram illustrating an example of still another UI screen 902c according to the first embodiment. In the following, when the UI screens 902a to 902c need not be specifically distinguished, they are simply referred to as a UI screen 902. As illustrated in FIG. 10, the display control unit 201 may hide the icon 87b of the function providing application 22 that is determined, by the determining unit 202, as being unavailable (inexecutable). Alternatively, as illustrated in FIG. 11, the display control unit 201 may display the icon 87 of the unavailable function providing application 22 in a different display mode from the icon 87 of the function providing application 22 that is determined as being available (executable). For example, the display control unit 201 may change colors or luminance of the icons 87, text of application names, or backgrounds between the unavailable (inexecutable) function providing application 22 and the available (executable) function providing application 22. Further, to attract attention of the user, the display control unit 201 may display the icon 87 or the text of the application name of the unavailable (inexecutable) function providing application 22 together with a predetermined mark. In the examples illustrated in FIG. 10 and FIG. 11, the display control unit 201 displays, in the display area 86, the icon 87a of the scanner application as the available function providing application 22, and hides the icon 87b of the copy application as the unavailable (inexecutable) function providing application 22 or displays the icon 87b in a different mode from the mode of the icon 87a of the scanner application. Meanwhile, when the icon 87b of the copy application is displayed as illustrated in FIG. 11, the icon 87b of the copy application is prevented from being pressed or an error screen is displayed when the icon 87b is pressed.

Further, as illustrated in FIG. 9, the UI screen 902 includes the menu button 73, a disconnection button 81 for disconnecting the connection to the image forming apparatus 30, a logout button 82 for logging out of the image forming apparatus 30, an image forming apparatus name display area 84 for displaying a name of the currently connected or logged in image forming apparatus 30, a user display area 85 for displaying a user name of a user ID for identifying a login user, and a state display area 83 for displaying a message when an error occurs, for example. The display mode of the UI screen 902 is one example, and not limited to this example.

As described above, the information processing apparatus 20a of the first embodiment embodiment displays, on the operation panel 705, only the function providing applications 22 that are determined as being executable among the function providing applications 22 installed in the information processing apparatus 20a, on the basis of the available function information on the image forming apparatus 30. Therefore, according to the information processing apparatus 20a of the first embodiment, a user is able to easily recognize the function providing applications 22 that are available with respect to the image forming apparatus 30 connected to the information processing apparatus 20a when performing operation on the information processing apparatus 20a.

More specifically, for example, when the function providing applications 22 that use functions that are not included in the image forming apparatus 30 connected to the information processing apparatus 20a are displayed in the UI screen 902 on the operation panel 705, in some cases, it may be difficult for a user to determine which one of the function providing applications 22 is available. Therefore, the user may need to additionally perform operation of checking the functions of the image forming apparatus 30. In contrast, the information processing apparatus 20a of the first embodiment displays, on the operation panel 705. only the function providing applications 22 that are determined as being executable, so that it is possible to prevent the user from performing checking operation or the like.

Further, as described above, the information processing apparatus 20a of the first embodiment may display, on the operation panel 705, the function providing applications 22 that are determined as being inexecutable in a different display mode from that of the function providing applications 22 that are determined as being executable. If this configuration is adopted, according to the information processing apparatus 20a of the first embodiment, a user is able to check the list of the function providing applications 22 installed in the information processing apparatus 20a and then recognize which of the function providing applications 22 is executable or inexecutable.

Second Embodiment

In the first embodiment as described above, the information processing apparatus 20a displays, on the operation panel 705, only the function providing applications 22 that are available in the information processing apparatus 20a in accordance with the functions of the connected image forming apparatus 30. In a second embodiment, the function providing applications 22 to be displayed on the operation panel 705 are limited to only the function providing applications 22 that use the functions of the image forming apparatus 30.

The entire configuration of the information processing system 100a and the configurations of the image forming apparatus 30 and the information processing apparatus 20a according to the second embodiment are the same as those of the first embodiment described above with reference to FIG. 1 to FIG. 6.

Figure 12:
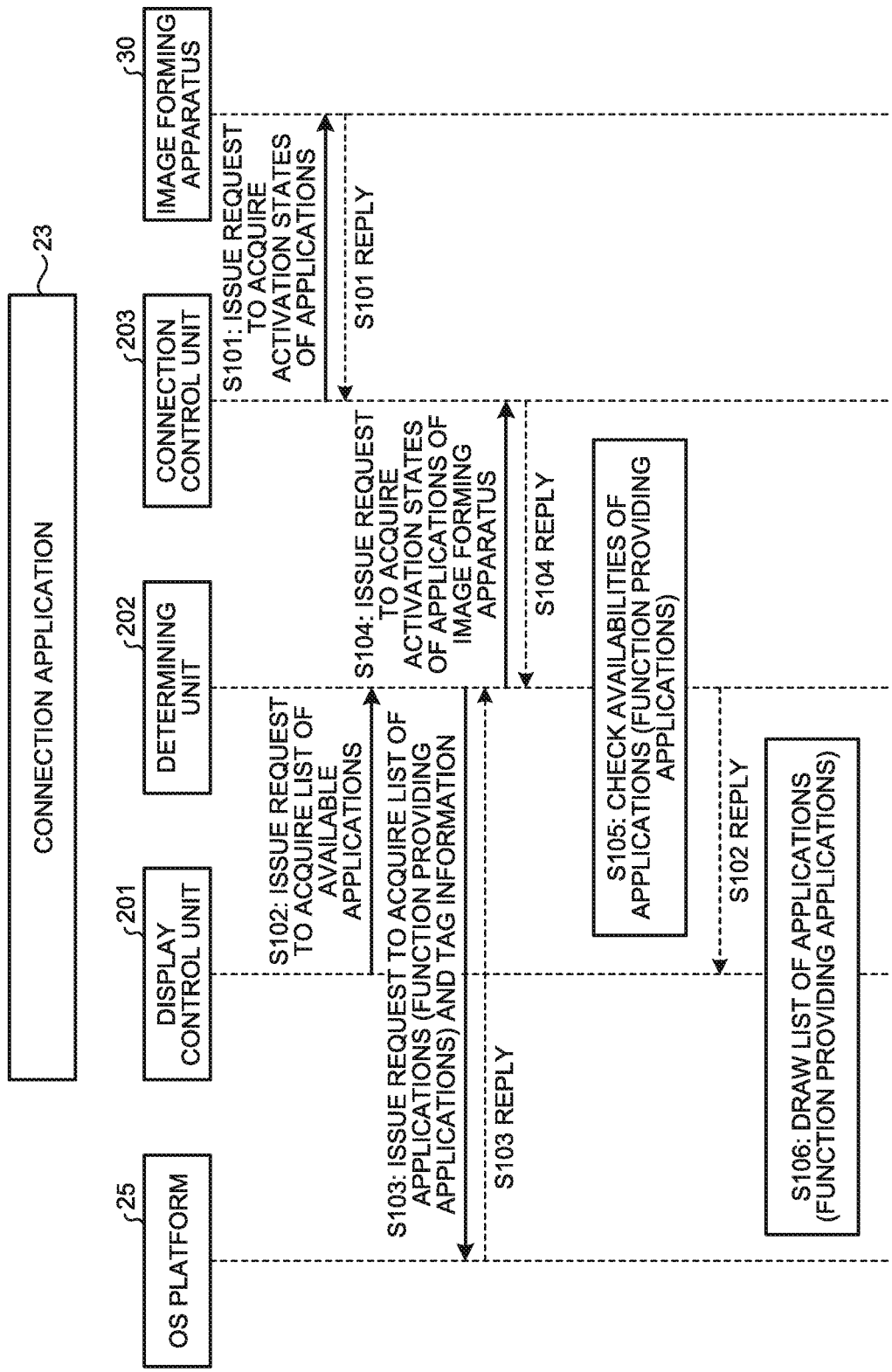
FIG. 12 is a sequence diagram illustrating an example of the flow of a list screen display process according to a second embodiment.

FIG. 12 is a sequence diagram illustrating an example of the flow of a list screen display process according to the second embodiment. A process of acquiring the activation states of the applications of the image forming apparatus 30 at Step S101 and a process of issuing a request to acquire a list of the available function providing applications 22 at Step S102 are the same as the processes performed at Steps S1 and S2 illustrated in FIG. 7.

Upon receiving the request from the display control unit 201, the determining unit 202 of the second embodiment issues, to the OS 25a, a request to acquire a list of the function providing applications 22 installed in the information processing apparatus 20a and tag information on each of the function providing applications 22 (S103). The tag information is information indicating a function that is included in the image forming apparatus 30 and that is used by each of the function providing applications 22. Further, as one example, the tag information is included in a program in which each of the function providing applications 22 is written. The OS 25a acquires the tag information from the program in which each of the function providing applications 22 is written, and transmits the tag information to the determining unit 202.

FIG. 13 is a diagram illustrating an example of the tag information according to the second embodiment. As illustrated in FIG. 13, tag information 500a is information in which application names for identifying the function providing applications 22 and functions (to-be-used functions) that are included in the image forming apparatus 30 and that are used by the function providing applications 22 are associated. The tag information 500a of the second embodiment is one example of to-be-used function information. Meanwhile, the function providing application 22 has a plurality of kinds of tag information, and therefore, the tag information (to-be-used function information) of the second embodiment will also be referred to as first tag information.

A process performed by the determining unit 202 to acquire the available function information acquired by the connection control unit 203 at Step S104 is the same as the process performed at Step S4 illustrated in FIG. 7. Subsequently, the determining unit 202 checks (determines) availabilities of the function providing applications 22 that are acquired from the OS 25a (S105). More specifically, the determining unit 202 of the second embodiment compares the tag information 500a and the available function information on the image forming apparatus 30, and checks (determines) whether each of the function providing applications 22 uses the functions included in the available function information. If the available function information includes functions that are included in the image forming apparatus 30 and used by the function providing application 22 (the function written in the tag information 500a) and the function providing application 22 uses any of the functions included in the available function information, the determining unit 202 includes the subject function providing application 22 in a list to be provided to the display control unit 201. For example, when the available function information on the image forming apparatus 30 includes a "copy" function, the determining unit 202 determines that the function providing application 22 that is associated with the "copy" function in the tag information 500a is executable. Further, when the available function information on the image forming apparatus 30 does not include a "scanner" function, the determining unit 202 determines that the function providing application 22 that is associated with the "scanner" function in the tag information 500a is inexecutable. Furthermore, the determining unit 202 determines that the function providing application 22 that is not associated with any of the functions of the image forming apparatus 30 in the tag information 500a is the function providing application 22 that does not use the functions included in the available function information.

Subsequently, the display control unit 201 acquires a list of the function providing applications 22 that are determined, by the determining unit 202, as being available (executable), and draws (displays) the list in the UI screen 902 on the operation panel 705 (S106). In the second embodiment, the function providing applications 22, for which it is determined that the functions included in the available function information are used, among the function providing applications 22 that are determined, by the display control unit 201, as being executable are displayed on the operation panel 705, and, the function providing applications 22, for which it is determined that the functions included in the available function information are not used, are not displayed on the operation panel 705. For example, a browser application, a camera application, and the like among the function providing applications 22 are available independent of the functions of the image forming apparatus 30, and do not use the functions included in the available function information. Therefore, the display control unit 201 does not display the browser application, the camera application, and the like on the operation panel 705.

As described above, according to the information processing apparatus 20a of the second embodiment, only the function providing applications 22, for which it is determined that the functions included in the available function information are used among the function providing applications 22 that are determined as being executable, are displayed on the operation panel 705, so that a user is able to easily find a desired function.

Third Embodiment

In the first and the second embodiments as described above, the information processing apparatus 20a determines that the function providing applications 22 that use functions that are not included in the acquired available function information are inexecutable, and does not display these function providing applications 22. In a third embodiment, when the available function information does not include functions used by the function providing applications 22, the information processing apparatus 20a re-issues a query about the available function information and determines executability again.

The entire configuration of the information processing system 100a and the configurations of the image forming apparatus 30 and the information processing apparatus 20a according to the third embodiment are the same as those of the first embodiment described above with reference to FIG. 1 to FIG. 6.

Figure 14:
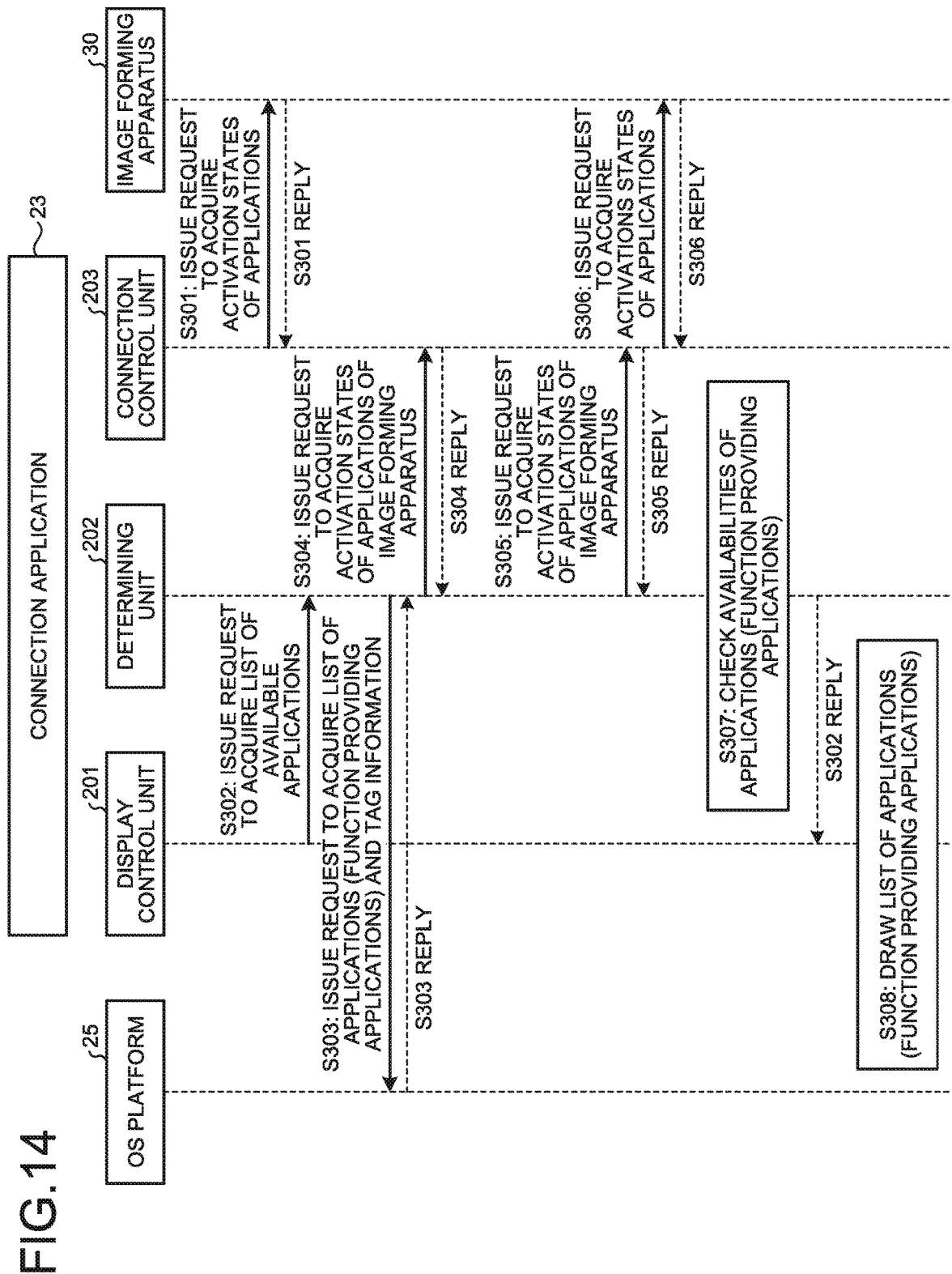
FIG. 14 is a sequence diagram illustrating an example of the flow of a list screen display process according to a third embodiment.

FIG. 14 is a sequence diagram illustrating an example of the flow of a list screen display process according to the third embodiment. Processes from Step S301, at which the activation states of the applications of the image forming apparatus 30 are acquired, to Step S304 are the same as the processes performed from Steps S101 to S104 illustrated in FIG. 12.

The determining unit 202 of the third embodiment compares the list of the function providing applications 22 acquired from the OS 25a through the process at Step S303, the tag information 500a, and the available function information acquired through the process at Step S304, and determines whether the available function information does not include any of the to-be-used functions that are included in the tag information 500a. If the available function information does not include any of the to-be-used functions that are included in the tag information 500a, the determining unit 202 re-issues a request to acquire the activation states of the applications of the MFP main body (available function information) to the connection control unit 203 (S305). Re-issuance of the request to acquire the available function information may be referred to as an instruction to re-collect the available function information.

Upon receiving the instruction to re-collect the available function information from the determining unit 202, the connection control unit 203 re-issues, to the image forming apparatus 30, a query about the activation states (available function information) of the applications of the MFP main body, and acquires the available function information (S306).

Subsequently, the determining unit 202 checks (determines) availabilities of the function providing applications 22 that are acquired from the OS 25a (S307). More specifically, the determining unit 202 of the third embodiment compares the tag information 500a and the available function information on the image forming apparatus 30 acquired through the processes at Steps S304 and S305, and determines whether each of the function providing applications 22 uses the functions included in the available function information. A process of drawing (displaying) the list of the function providing applications 22 at Step S308 is the same as the process performed at Step S106 illustrated in FIG. 8 described in the second embodiment.

As described above, when the available function information does not include any of the to-be-used functions that are included in the tag information 500a, the information processing apparatus 20a of the third embodiment issues a query about the available function information to the image forming apparatus 30. Therefore, according to the information processing apparatus 20a of the third embodiment, it is possible to determine whether each of the function providing applications 22 is available with high accuracy. For example, when a certain application of the image forming apparatus 30 is not activated or being reactivated during previous acquisition of the available function information, some information may be missing in the available function information. In this case, the information processing apparatus 20a of the third embodiment acquires the available function information again, to thereby prevent missing information when acquiring the available function information and make it possible to more accurately determine the availability of each of the function providing applications 22.

Meanwhile, while the information processing apparatus 20a issues queries about the available function information to the image forming apparatus 30 twice in the third embodiment, the number of repetitions of the queries and timings of the queries are not limited to this example.

Fourth Embodiment

In a fourth embodiment, the information processing apparatus 20a determines the function providing applications 22 to be displayed on the operation panel 705 not only depending on the availability of each of the function providing applications 22 but also on user's authority.

The entire configuration of the information processing system 100a and the configurations of the image forming apparatus 30 and the information processing apparatus 20a according to the third embodiment are the same as those of the first embodiment described above with reference to FIG. 1 to FIG. 4.

Figure 15:
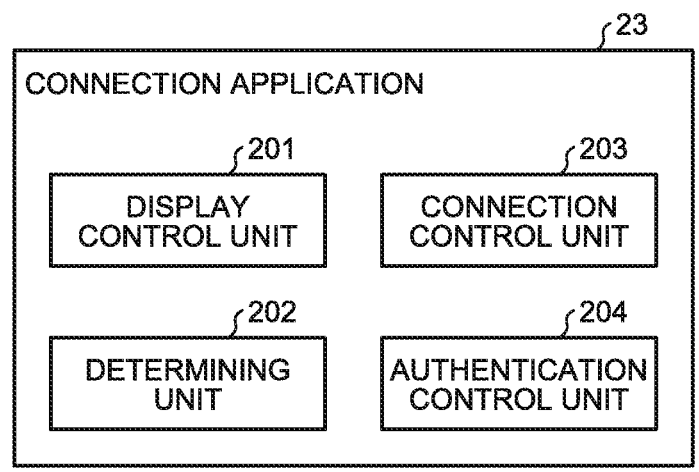
FIG. 15 is a block diagram illustrating an example of functions of a connection application according to a fourth embodiment.

FIG. 15 is a block diagram illustrating an example of functions of the connection application 23 according to the fourth embodiment. As illustrated in FIG. 15, the connection application 23 of the fourth embodiment includes the display control unit 201, the determining unit 202, the connection control unit 203, and an authentication control unit 204.

The display control unit 201, the determining unit 202, and the connection control unit 203 have the same functions as those of the first embodiment. The authentication control unit 204 issues an authentication request for a user of the information processing apparatus 20a to the image forming apparatus 30, and acquires authority information indicating user's authority to the image forming apparatus 30.

Figure 16:
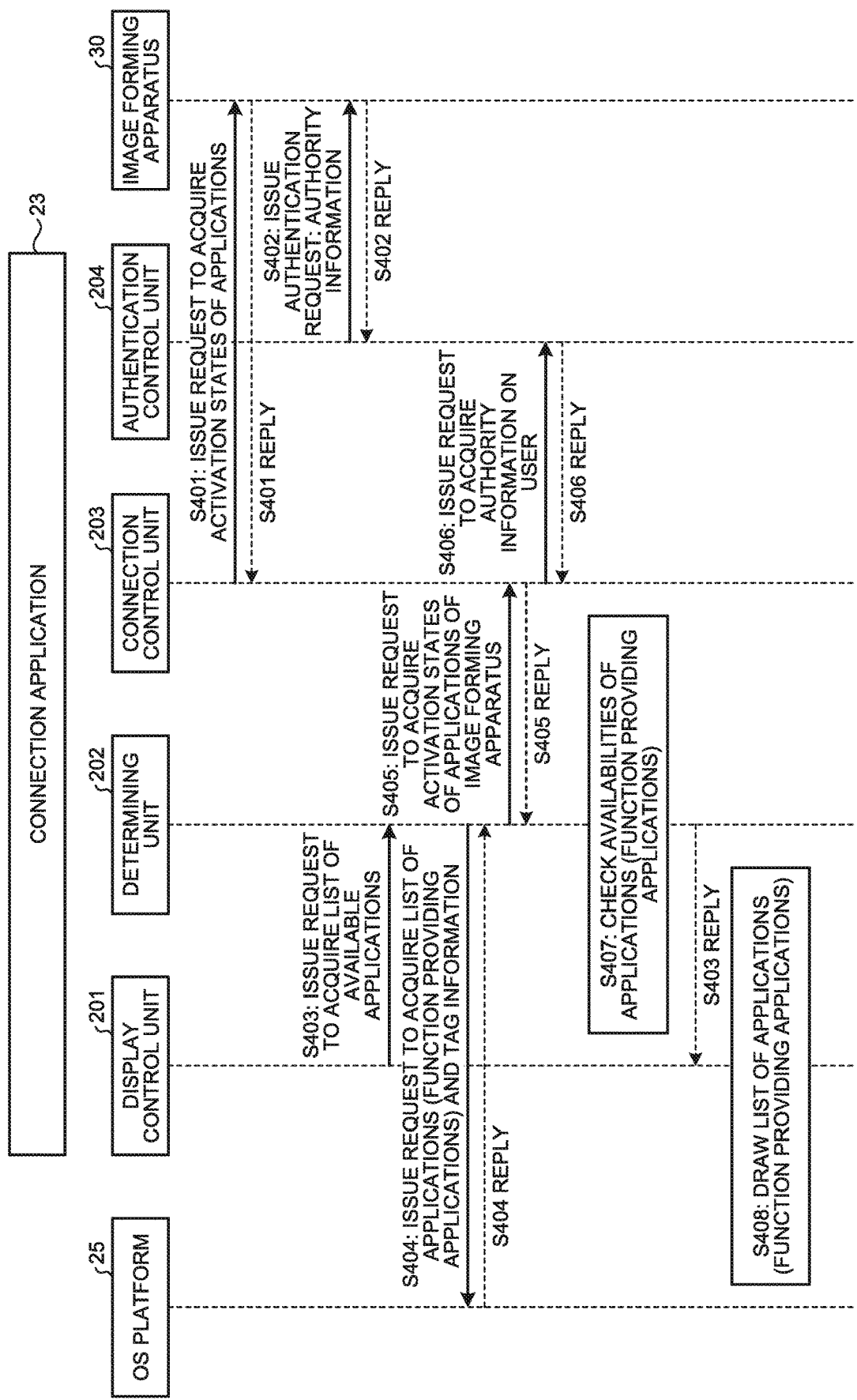
FIG. 16 is a sequence diagram illustrating an example of the flow of a list screen display process according to the fourth embodiment.

FIG. 16 is a sequence diagram illustrating an example of the flow of a list screen display process according to the fourth embodiment. A process of acquiring the activation states of the applications of the image forming apparatus 30 at Step S401 is the same as the process performed at Step S1 illustrated in FIG. 7 described in the first embodiment.

Figures 17, 18:
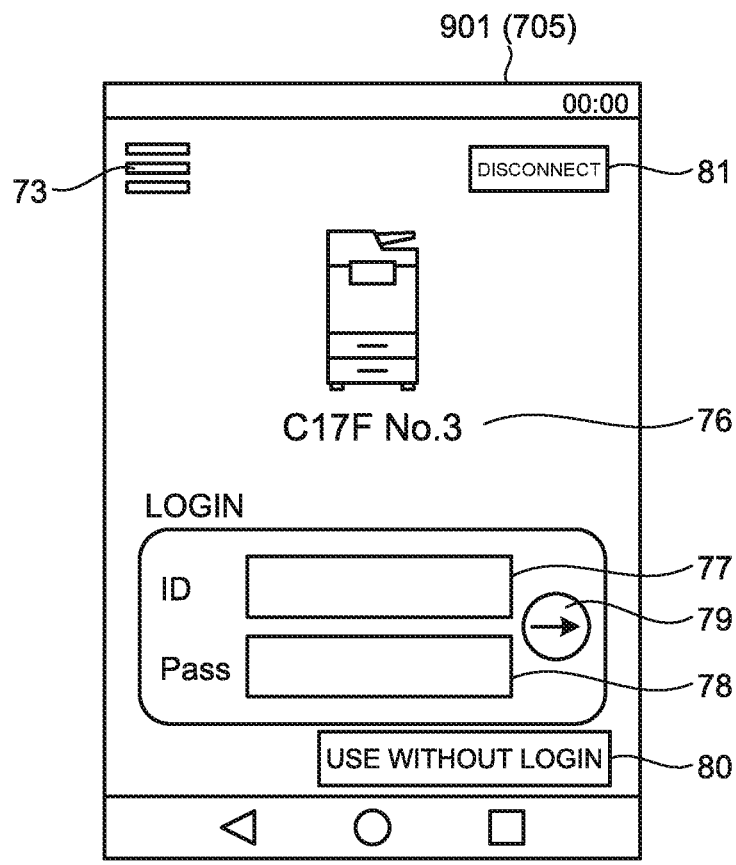
FIG. 17 is a diagram illustrating an example of a login screen according to the fourth embodiment.
FIG. 18 is a diagram illustrating an example of tag information according to the fourth embodiment.

In the fourth embodiment, the authentication control unit 204 issues a user authentication request to the image forming apparatus 30, and acquires authority information on the user from the image forming apparatus 30 (S402). FIG. 17 is a diagram illustrating an example of a login screen 901 according to the fourth embodiment. The login screen 901 may also be referred to as an authentication screen, and includes, as illustrated in FIG. 17 for example, a user ID entry field 77, a password entry field 78, and an execution button 79 for performing login. The login screen 901 is displayed by the display control unit 201 after the connection screen 900 is displayed and before the process in FIG. 16 is started, for example.

Further, as in the example illustrated in FIG. 17, the login screen 901 may further include the menu button 73, the disconnection button 81 for disconnecting the connection to the image forming apparatus 30, a display area 76 for displaying an apparatus name of the connected image forming apparatus 30, and a "use without login" button 80.

The authentication control unit 204 transmits a user ID and a password input in the login screen 901 to the image forming apparatus 30, and requests authentication of a user with the user ID. As a reply to the authentication request, the authentication control unit 204 acquires an authentication result (login permission/denial) of the user with the user ID. Further, if authentication is successful (login is permitted), the authentication control unit 204 acquires authority information on the user with the user ID from the image forming apparatus 30. The authority information is information indicating user's authority to the image forming apparatus 30, and includes, for example, authorized functions and an authority type (a general user, an administrator, or the like) for each user.

Referring back to the process in FIG. 16, a process of issuing a request to acquire a list of the available function providing applications 22 at Step S403 is the same as the process performed at Step S2 illustrated in FIG. 7 described in the first embodiment.

Subsequently, upon receiving the request from the display control unit 201, the determining unit 202 issues, to the OS 25a, a request to acquire a list of the function providing applications 22 installed in the information processing apparatus 20a and the tag information on each of the function providing applications 22 (S404). The tag information of the fourth embodiment is information indicating user's authority that is necessary for each of the function providing applications 22. The tag information of the fourth embodiment will also be referred to as second tag information. Further, at this time, the determining unit 202 may also acquire the first tag information (the tag information 500a) from the OS 25a.

FIG. 18 is a diagram illustrating an example of tag information 500b according to the fourth embodiment. As illustrated in FIG. 18, the tag information 500b is information in which application names for identifying the function providing applications 22 and authority needed to execute the function providing applications 22 are associated. The authority needed to execute the function providing applications 22 is authority that is required by the functions that are included in the image forming apparatus 30 and that are used by the function providing applications 22. For example, the certain function providing application 22 needs administrative authority to the image forming apparatus 30. In this case, the function providing application 22 is available when the user with the user ID that is input in the login screen 901 of the information processing apparatus 20a has administrative authority to the image forming apparatus 30.

Referring back to the process in FIG. 16, a process of acquiring the activation states of the applications of the image forming apparatus 30 (the applications of the MFP main body) at S405 is the same as the process performed at Step S4 illustrated in FIG. 7 described in the first embodiment.

Subsequently, the determining unit 202 acquires authority information on the user from the authentication control unit 204 (S406). Then, the determining unit 202 checks (determines) availabilities of the function providing applications 22 acquired from the OS 25a (S407). More specifically, the determining unit 202 of the fourth embodiment checks (determines) the availabilities of the function providing applications 22 similarly to the first embodiment, and further determines the function providing applications 22 that are executable by the user's authority, on the basis of the user authority information acquired through the process at S406 and the tag information 500b acquired through the process at S404. If the authority information on the currently logged in user includes the information needed to execute the function providing application 22, the determining unit 202 determines that use of the function providing application 22 is permitted. The determining unit 202 transmits the availability (executability) of each of the function providing applications 22 and execution permission/denial of each of the function providing applications 22 based on the user's authority to the display control unit 201. Meanwhile, the display control unit 201 may determine the execution permission/denial of each of the function providing applications 22. The determining unit 202 may determine the function providing applications 22 that are executable by the user's authority on the basis of the tag information 500a together with the tag information 500b or instead of the tag information 500b. In other words, if all of the to-be-used functions of the function providing applications 22 indicated by the tag information 500a are executable by the user's authority, the determining unit 202 may determine that the function providing applications 22 are available (executable).

Subsequently, the display control unit 201 acquires, from the determining unit 202, a list of the function providing applications 22 that are determined as being available (executable), and draws (displays) the list on the operation panel 705 (S408). Further, the display control unit hides, on the operation panel 705, the function providing applications 22 that use functions for which use is denied by the user's authority given to the currently logged in user among the function providing applications 22 determined as being executable, on the basis of the authority information. For example, in the example illustrated in FIG. 18, the function providing application 22 with an application name of "B" is displayed in the UI screen 902 on the operation panel 705 only when the authority information on the currently logged in user includes both of authority to use the scanner function and authority to use the printer.

As described above, the information processing apparatus 20a of the fourth embodiment acquires the authority information on the user from the image forming apparatus 30, and hides, on the operation panel 705, the function providing applications 22 that use functions for which use is denied by the user's authority given to the currently logged in user among the function providing applications 22 determined as being executable, on the basis of the authority information. Therefore, the information processing apparatus 20a of the fourth embodiment displays only the function providing applications 22 that the user is permitted to use, so that it is possible to prevent the user from performing operation of further checking presence or absence of authority before activating the function providing applications 22. Further, according to the information processing apparatus 20a of the fourth embodiment, the function providing applications 22 for which the user does not have authority are not displayed, so that it is possible to improve the security.

Meanwhile, when the "use without login" button 80 is pressed in the login screen 901 illustrated in FIG. 15, the authentication control unit 204 does not issue the authentication request at S502. In this case, the display control unit 201 displays, in the UI screen 902 on the operation panel 705, only the function providing applications 22 for which an authentication process is not needed, among the function providing applications 22 that are determined as being executable.

Fifth Embodiment

In a fifth embodiment, the information processing apparatus 20a displays, on the operation panel 705, the function providing applications 22 that are determined as being executable for each of the connected image forming apparatuses 30.

The entire configuration of the information processing system 100a and the configurations of the image forming apparatus 30 and the information processing apparatus 20a according to the fifth embodiment are the same as those of the first embodiment described above with reference to FIG. 1 to FIG. 4. Further, the connection application 23 of the fifth embodiment includes, similarly to the fourth embodiment described with reference to FIG. 15, the display control unit 201, the determining unit 202, the connection control unit 203, and the authentication control unit 204.

Furthermore, the display control unit 201, the determining unit 202, the connection control unit 203, and the authentication control unit 204 of the connection application 23 of the fifth embodiment repeat respective processes for each of the image forming apparatuses 30.

More specifically, the connection control unit 203 of the fifth embodiment establishes communication connections to the plurality of image forming apparatuses 30, and collects the available function information from each of the image forming apparatuses 30.

Further, the determining unit 202 of the fifth embodiment compares the tag information 500a (to-be-used function information) and the available function information on each of the image forming apparatuses 30, and determines the function providing applications 22 that have the to-be-used function information included in the available function information for each of the image forming apparatuses 30.

Furthermore, the display control unit 201 of the fifth embodiment displays, on the operation panel 705, a list of the function providing applications 22 that have the to-be-used function information included in the available function information on each of the image forming apparatuses 30, for each of the image forming apparatuses 30.

Moreover, the authentication control unit 204 of the fifth embodiment transmits a user ID and a password input in the login screen 901 to each of the image forming apparatuses 30, and issues a request to perform authentication on the user ID and the user to each of the image forming apparatuses 30. Furthermore, the authentication control unit 204 acquires, as a reply to the authentication request, an authentication result (login permission/denial) of the user with the user ID and the authority information on the user for each of the image forming apparatuses 30.

Figure 19:
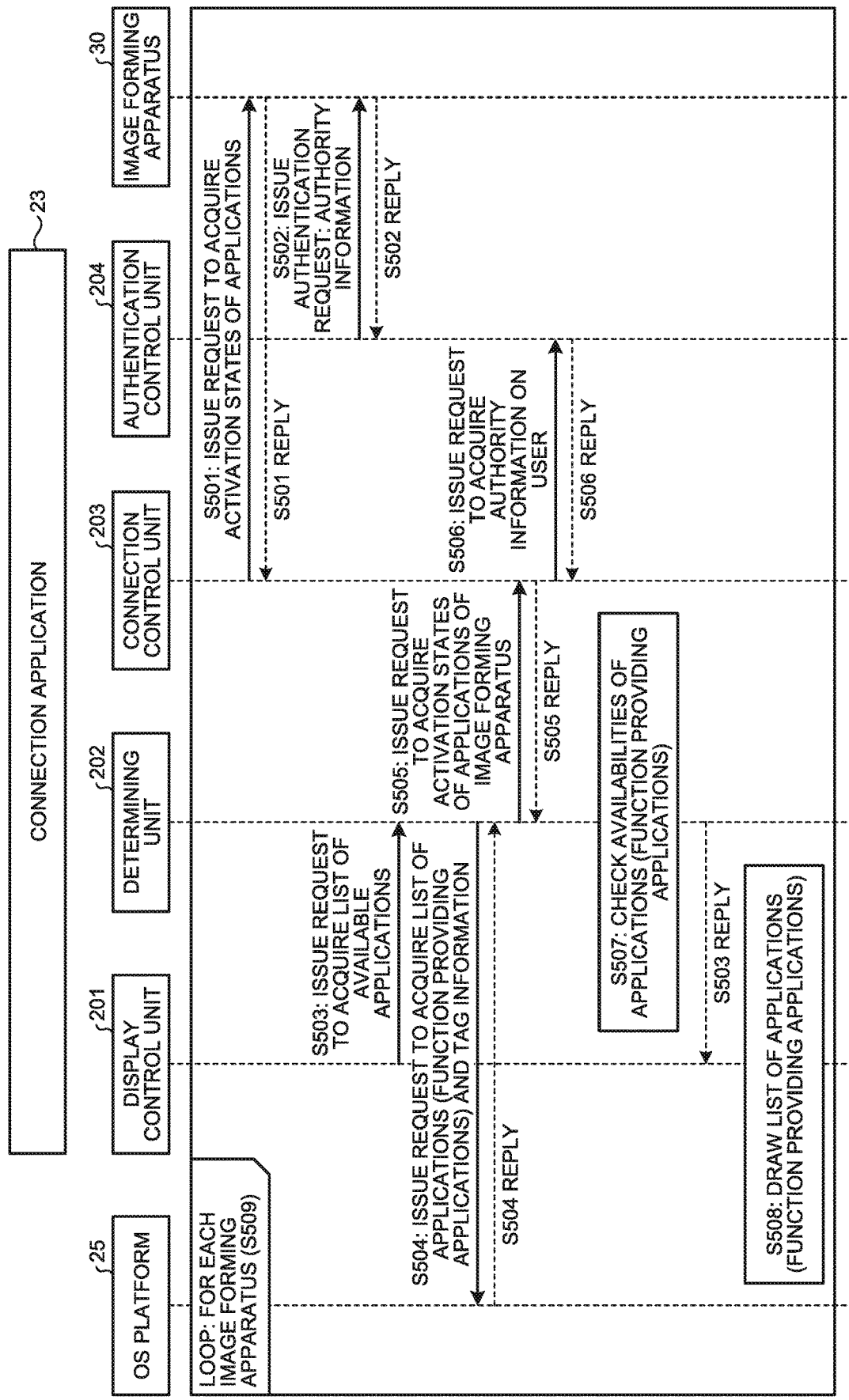
FIG. 19 is a sequence diagram illustrating an example of the flow of a list screen display process according to a fifth embodiment.

FIG. 19 is a sequence diagram illustrating an example of the flow of a list screen display process according to the fifth embodiment. Processes from S501 for acquiring the activation states of the applications of the image forming apparatuses 30 to Step S508 for drawing (displaying) the list of the available function providing applications 22 are the same as the processes performed from Steps S401 to S408 illustrated in FIG. 16 described in the fourth embodiment.

As illustrated in FIG. 19, in the fifth embodiment, the display control unit 201, the determining unit 202, the connection control unit 203, and the authentication control unit 204 repeat the processes from Steps S501 to S508 for each of the image forming apparatuses 30 (S509). By repeating the processes as described above, the display control unit 201 displays, on the operation panel 705, the list of the available function providing applications 22 for each of the image forming apparatuses 30.

Figure 20:
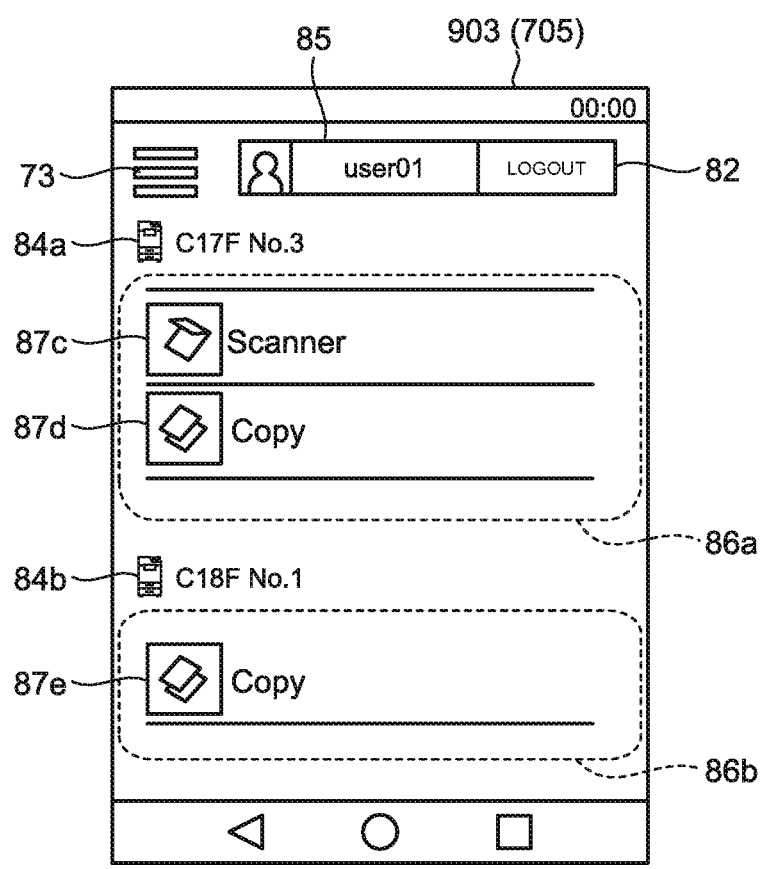
FIG. 20 is a diagram illustrating lists in a UI screen according to the fifth embodiment.

FIG. 20 is a diagram illustrating lists in a UI screen 903 according to the fifth embodiment. As illustrated in FIG. 20, the UI screen 903 is a screen displayed on the operation panel 705, and includes display areas 86a and 86b for displaying lists of applications for the plurality of image forming apparatuses 30. For example, the display control unit 201 provides, in the UI screen 903, image forming apparatus name display areas 84a and 84b for displaying names of the currently connected or logged in image forming apparatuses 30, for the respective image forming apparatuses 30. Further, the display control unit 201 arranges the display areas 86a and 86b for displaying the lists of applications that are available in the respective image forming apparatuses 30, below the image forming apparatus name display areas 84*a* and 84*b*. Furthermore, the display control unit 201 displays, in each of the display areas 86*a* and 86*b* for displaying the lists of applications, names of the function providing applications 22 that are available in each of the image forming apparatuses 30 and icons 87*c* to 87*e* representing the available function providing applications 22.

Moreover, as illustrated in FIG. 20, the UI screen 903 may include the user display area 85 for displaying a user name or a user ID for identifying the logged in user, and the logout button 82 for logging out of the image forming apparatus 30. Furthermore, the logout button 82 may be provided for each of the image forming apparatuses 30. A display mode of the UI screen 903 is one example, and embodiments are not limited to this example.

Meanwhile, the display control unit 201 may display the available function providing applications 22 of all of the communicable image forming apparatuses 30 in the single UI screen 903, or may divide the UI screen 903 into a plurality of pages and display, in each of the pages, each of the image forming apparatuses 30 and the function providing applications 22 that are executable with respect to each of the image forming apparatuses 30.

As described above, the information processing apparatus 20*a* of the fifth embodiment displays, on the operation panel 705, the list of the function providing applications 22 that have the to-be-used function information included in the available function information on the image forming apparatus 30, for each of the image forming apparatuses 30, so that a user can easily recognize the image forming apparatus 30 for which the desired function providing application 22 is available.

Sixth Embodiment

FIG. 21 is a diagram illustrating an example of an entire configuration of an information processing system 100*b* according to a sixth embodiment. As illustrated in FIG. 21, the information processing system 100*b* includes one or more external apparatuses 10 and a smart device 20*c*.

As illustrated in FIG. 21, the external apparatuses 10 are, for example an MFP, an electronic blackboard (interactive whiteboard (IWB)), a projector, and the like, but embodiments are not limited to this example. Each of the external apparatuses 10 has a copy function, a scanner function, a facsimile function, a print (printing) function, and the like. The functions included in each of the external apparatuses 10 are not limited to those as described above, and the external apparatuses 10 may have different functions. The external apparatuses 10 are one example of a communication target in the sixth embodiment. In the sixth embodiment, the external apparatuses 10 have the same functions as those of the image forming apparatus 30 of the first embodiment.

Further, each of the external apparatuses 10 has application software for implementing the copy function, the scanner function, the facsimile function, the print function, and the like. Hereinafter, the application software executed by the external apparatuses 10 will be referred to as an external apparatus application. The external apparatus application corresponds to the application of the image forming apparatus 30 of the first embodiment.

The smart device 20*c* is, for example, an information processing terminal, such as a tablet terminal or a smartphone. The smart device 20*c* is one example of an information processing apparatus in the sixth embodiment. However, the information processing apparatus is not limited to the smart device 20*c* as long as a device is able to perform communication with the external apparatuses 10. For example, the information processing apparatus may be a personal computer, or an operation terminal that is connected to a device, such as an image forming apparatus, with a wire.

The smart device 20*c* includes platform application software (platform application) 23*c*, an OS platform 25, and various kinds of application software (applications) 22*c*.

The OS platform 25 is a platform that is provided by an OS of the smart device 20*c*. The platform application 23*c* and the applications 22*c* of the sixth embodiment are executed on the OS platform 25. The OS platform 25 is, for example, a platform provided by Android (registered trademark). The OS platform 25 has the same functions as those of the OS 25*a* of the first embodiment.

The platform application 23*c* is application software that serves as a platform for performing processes using the functions of the external apparatuses 10. The platform application 23*c* includes the display control unit 201, the determining unit 202, the connection control unit 203, and the authentication control unit 204. Further, the platform application 23*c* includes a function to connect the smart device 20*c* and the external apparatus 10, and therefore is also referred to as external apparatus connection application software (an external apparatus connection application). The platform application 23*c* has the same functions as those of the connection application 23 of the first embodiment.

The applications 22*c* are application software that is installed in the smart device 20*c* and performs processes for implementing various functions. The applications 22*c* of the sixth embodiment include application software for performing processes using the functions of the external apparatuses 10. More specifically, for example, the applications 22*c* include the copy application that uses the copy function of the external apparatus 10, the scanner application that uses the scanner function, the facsimile application for using the facsimile function, the printer application for using the printer function, and the like. Application software for performing processes using the functions of the external apparatus 10 are referred to as external apparatus function providing application. Further, the applications 22*c* are not limited to those as described above, and may be a browser application or a camera application. The applications 22*c* are stored in a ROM or the like (to be described later). The applications 22*c* have the same functions as those of the function providing applications 22 of the first embodiment.

The smart device 20*c* of the sixth embodiment includes the applications 22*c* and the platform application 23*c* as separate pieces of application software, so that even when a large number of the applications 22*c* are present in accordance with target processes, the platform application 23*c* is able to efficiently perform processes by controlling connection to the external apparatuses 10. Further, different processes may be performed to connect to the external apparatuses 10 depending on the information processing apparatus. By providing the applications 22*c* and the platform application 23*c* as separate pieces of application software as in the sixth embodiment, it is possible to apply the common applications 22*c* even in an information processing apparatus having a different connection specification. With this configuration, for example, even when the information processing apparatus is the smart device 20*c*, an image forming apparatus, and an operating unit provided in the image forming apparatus, it is possible to apply the common applications 22*c*. Therefore, creators of the applications 22*c* are able to more easily create the applications 22*c*.

A list screen display program executed by the information processing apparatus 20a, the fixed operating unit 20b, and the smart device 20c of the first to the sixth embodiments is provided by being recorded in a computer-readable recording medium, such as a CD-ROM, a flexible disk (FD), a compact disc-recordable (CD-R), or a digital versatile disk (DVD), in a computer-installable or computer-executable file format.

Further, the list screen display program executed by the information processing apparatus 20a, the fixed operating unit 20b, and the smart device 20c of the first to the sixth embodiments may be stored in a computer connected to a network, such as the Internet, and provided by being downloaded via the network. Furthermore, the list screen display program executed by the information processing apparatus 20a, the fixed operating unit 20b, and the smart device 20c of the first to the sixth embodiments may be provided or distributed via a network, such as the Internet. Moreover, the list screen display program executed by the information processing apparatus 20a, the fixed operating unit 20b, and the smart device 20c of the first to the sixth embodiments may be provided by being incorporated in a ROM or the like in advance.

Furthermore, the list screen display program executed by the information processing apparatus 20a, the fixed operating unit 20b, and the smart device 20c of the first to the sixth embodiments has a module structure including the above-described units (the display control unit, the determining unit, the connection control unit, and the authentication control unit). As actual hardware, a CPU (processor) reads the list screen display program from the above-described storage medium and executes the program, so that the above-described units are loaded on the main storage device, and the display control unit, the determining unit, the connection control unit, and the authentication control unit are generated on the main storage device.

According to an embodiment of the present invention, when a user performs operation on an information processing apparatus, the user is able to easily recognize application software that is available in an external apparatus connected to the information processing apparatus.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
a memory configured to store therein a plurality of pieces of application software; and
processing circuitry configured to,
establish a communication connection to an external apparatus,
acquire a list of applications locally installed in the information processing apparatus that perform processing using functions of the external apparatus,
query the external apparatus for available function information indicating at least one function included in the external apparatus,
collect the available function information from the external apparatus,
determine at least one piece of application software installed on the information processing apparatus that is executable with respect to the external apparatus among the pieces of application software stored in the memory of the information processing apparatus by comparing the list of applications locally installed on the information processing apparatus with the available function information acquired from the external apparatus, and
display, on a display device, icons associated with the pieces of application software that are determined as being executable such that an icon associated with at least one piece of application software that is determined as being inexecutable is hidden in the display device or displayed differently on the display device compared to the pieces of application software that are determined as being executable, the icons that are displayed being selectable to execute the pieces of application software associated therewith on the information processing apparatus.

2. The information processing apparatus according to claim 1, wherein the processing circuitry is configured to,
compare the available function information and to-be-used function information that indicates functions that are included in the external apparatus and that are used by the pieces of application software, determine whether each of the pieces of the application software uses any of the functions included in the available function information, and display, on the display device, at least one piece of application software for which it is determined that any of the functions included in the available function information is used among the pieces of application software that are determined as being executable, and hides, in the display device, at least one piece of application software for which it is determined that the functions included in the available function information are not used.

3. The information processing apparatus according to claim 2, wherein the processing circuitry is configured to send a query about the available function information to the external apparatus, in response to the functions included in the to-be-used function information including a function that is not included in the available function information.

4. The information processing apparatus according to claim 2, wherein the processing circuitry is configured to,
acquire authority information on a user from the external apparatus, and
hide, in the display device, at least one piece of application software that uses a function for which use is denied by authority given to the user among the pieces of application software that are determined as being executable, based on the authority information.

5. The information processing apparatus according to claim 2, wherein the processing circuitry is configured to,
establish communication connections to a plurality of external apparatuses,
collect the available function information on each of the external apparatuses,
compare the to-be-used function information and the available function information on each of the external apparatuses,
determine at least one piece of application software that has the to-be-used function information included in the available function information for each of the external apparatuses, and
display, on the display device, a list of the pieces of application software that have the to-be-used function information included in the available function information on each of the external apparatuses, for each of the external apparatuses.

6. The information processing apparatus of claim 1, wherein the processing circuitry is configured to hide the icon associated with the at least one piece of application software determined as being inexecutable such ones of the pieces of application software that use functions not activated in the external apparatus are hidden from selection on the display device.

7. The information processing apparatus according to claim 1, wherein the processing circuitry is configured to query the external apparatus for the available function information upon establishing the communication connection with the external apparatus such that the information processing apparatus collects the available function information from the external apparatus prior to displaying the icons that are selectable to execute the pieces of application software associated therewith.

8. An information processing method comprising:
establishing a communication connection from an information processing apparatus to an external apparatus;
acquiring a list of applications locally installed in the information processing apparatus that perform processing using functions of the external apparatus;
querying the external apparatus for available function information indicating at least one function included in the external apparatus;
collecting the available function information from the external apparatus;
determining at least one piece of executable application software installed on the information processing apparatus among pieces of application software stored in a memory by comparing the list of applications locally installed on the information processing apparatus with the available function information acquired from the external apparatus; and
displaying, on a display device, icons associated with the pieces of application software that are determined as being executable such that an icon associated with at least one piece of application software that is determined as being inexecutable is hidden, in the display device, at least one piece of application software that is determined as being inexecutable, the icons that are displayed being selectable to execute the pieces of application software associated therewith on the information processing apparatus.

9. The information processing method of claim 8, wherein the displaying comprises:
hiding the icon associated with the at least one piece of application software determined as being inexecutable such ones of the pieces of application software that use functions not activated in the external apparatus are hidden from selection on the display device.

10. The method according to claim 8, wherein the querying queries the external apparatus for the available function information upon establishing the communication connection with the external apparatus such that the information processing apparatus collects the available function information from the external apparatus prior to displaying the icons that are selectable to execute the pieces of application software associated therewith.

11. A non-transitory computer-readable recording medium including programmed instructions that cause a computer to execute:
establishing a communication connection from an information processing apparatus to an external apparatus;
acquiring a list of applications locally installed in the information processing apparatus that perform processing using functions of the external apparatus;
querying the external apparatus for available function information indicating at least one function included in the external apparatus;
collecting the available function information from the external apparatus;
determining at least one piece of executable application software installed on the information processing apparatus among pieces of application software stored in a memory by comparing the list of applications locally installed on the information processing apparatus with the available function information acquired from the external apparatus; and
displaying, on a display device, the pieces of application software that are determined as being executable; such that an icon associated with at least one piece of application software that is determined as being inexecutable is hidden, in the display device, at least one piece of application software that is determined as being inexecutable, the icons that are displayed being selectable to execute the pieces of application software associated therewith on the information processing apparatus.

12. The non-transitory computer-readable recording medium of claim 11, wherein the programmed instructions, when executed, cause the computer to hide the icon associated with the at least one piece of application software determined as being inexecutable such ones of the pieces of application software that use functions not activated in the external apparatus are hidden from selection on the display device.

13. The non-transitory computer-readable recording medium according to claim 11, wherein the programmed instructions cause the computer to query the external apparatus for the available function information upon establishing the communication connection with the external apparatus such that the information processing apparatus collects the available function information from the external apparatus prior to displaying the icons that are selectable to execute the pieces of application software associated therewith.

\* \* \* \* \*